US010063773B2

United States Patent
Sato et al.

(10) Patent No.: US 10,063,773 B2
(45) Date of Patent: Aug. 28, 2018

(54) PHOTOGRAPHING APPARATUS, PHOTOGRAPHING METHOD AND COMPUTER-READABLE STORAGE MEDIUM STORING PHOTOGRAPHING PROGRAM OF PHOTOGRAPHING APPARATUS

(71) Applicant: OLYMPUS CORPORATION, Hachioji-shi, Tokyo (JP)

(72) Inventors: Kazuhiro Sato, Sagamihara (JP); Sachie Yamamoto, Hino (JP); Kyoichi Numajiri, Hachioji (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 173 days.

(21) Appl. No.: 14/336,414

(22) Filed: Jul. 21, 2014

(65) Prior Publication Data
US 2015/0022627 A1 Jan. 22, 2015

(30) Foreign Application Priority Data
Jul. 22, 2013 (JP) ................... 2013-151929

(51) Int. Cl.
*H04N 5/232* (2006.01)
(52) U.S. Cl.
CPC ..... *H04N 5/23238* (2013.01); *H04N 5/23219* (2013.01); *H04N 5/23293* (2013.01)
(58) Field of Classification Search
CPC ................................ H04N 5/23219
(Continued)

(56) References Cited

U.S. PATENT DOCUMENTS

2003/0223006 A1* 12/2003 Kito ................. G11B 27/11
348/333.03
2010/0302401 A1* 12/2010 Oku ................. H04N 5/23293
348/222.1
(Continued)

FOREIGN PATENT DOCUMENTS

JP 2011-040898 2/2011
JP 2011113196 A * 6/2011

OTHER PUBLICATIONS

Kuno et al., "Importance of Vision in Human-Robot Communication Understanding Speech Using Robot Vision and Demonstrating Proper Actions to Human Vision", May 2008, Springer, p. 205.*
(Continued)

*Primary Examiner* — Jeremaiah C Hallenbeck-Huber
*Assistant Examiner* — Amir Shahnami
(74) *Attorney, Agent, or Firm* — Volpe and Koenig, P.C.

(57) ABSTRACT

A photographing apparatus includes a photographing module, an image processor, a line-of-sight direction determination module, a main subject determination module, and an emphasis processor. The line-of-sight direction determination module determines a line-of-sight direction of the photographer by comparing with the reference line-of-sight direction of the photographer in the image data acquired by the image processor. The main subject determination module determines a main subject to be photographed by the photographer, based on the line-of-sight direction determined by the line-of-sight direction determination module. The emphasis processor executes an emphasis process on the main subject determined by the main subject determination module.

15 Claims, 13 Drawing Sheets

(58) Field of Classification Search
USPC .......................................................... 348/36
See application file for complete search history.

(56) References Cited

U.S. PATENT DOCUMENTS

2011/0115879 A1* 5/2011 Homma ................. G03B 17/02
348/36
2011/0141010 A1* 6/2011 Sakata ................. G06K 9/0061
345/156

OTHER PUBLICATIONS

Office Action issued in corresponding Chinese Patent Appln. No. 201410350473.4 dated Mar. 13, 2017, consisting of 19 pp. (English Translation Provided).

* cited by examiner

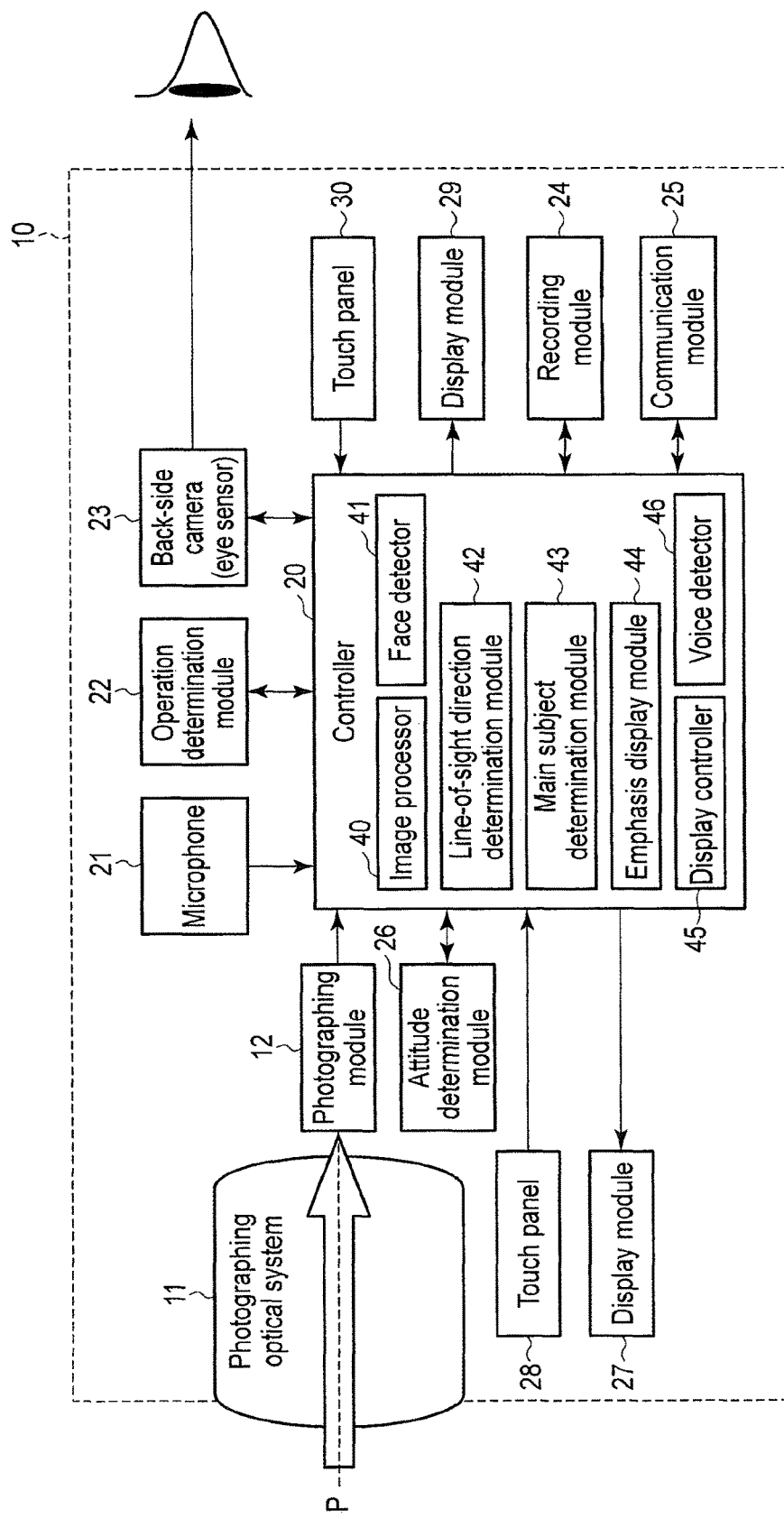
F I G. 1

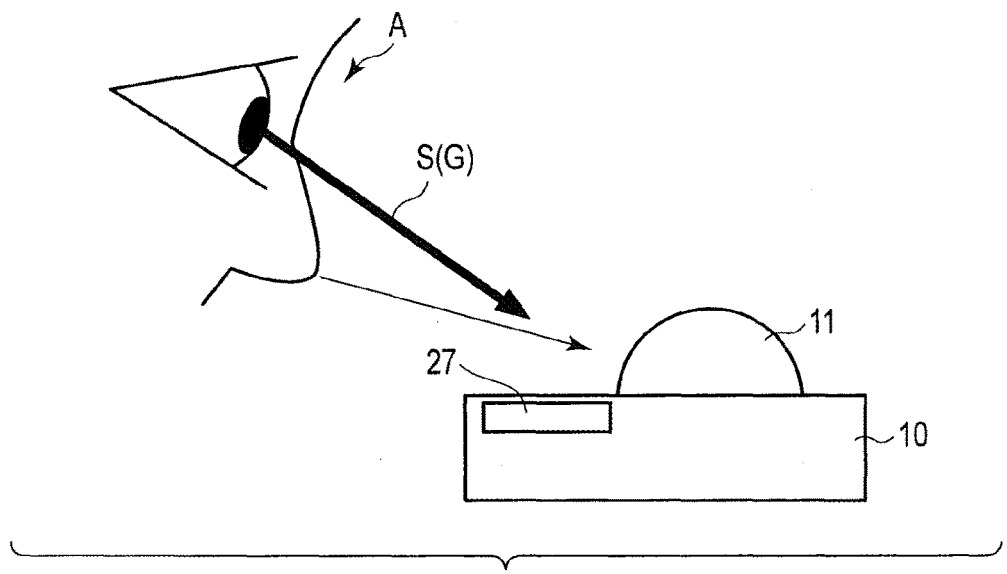
F I G. 5A
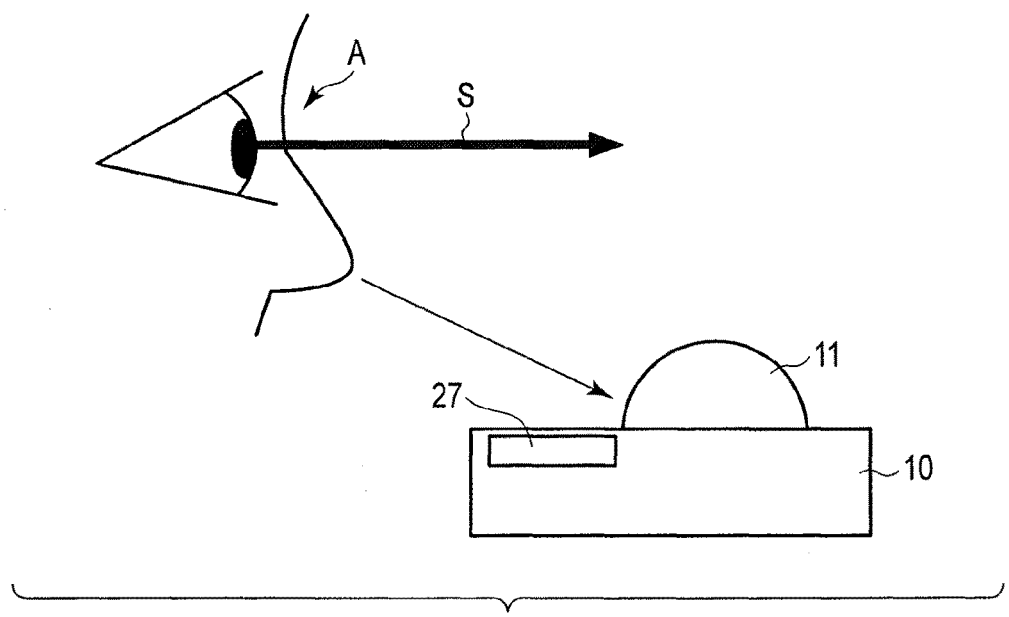
F I G. 5B

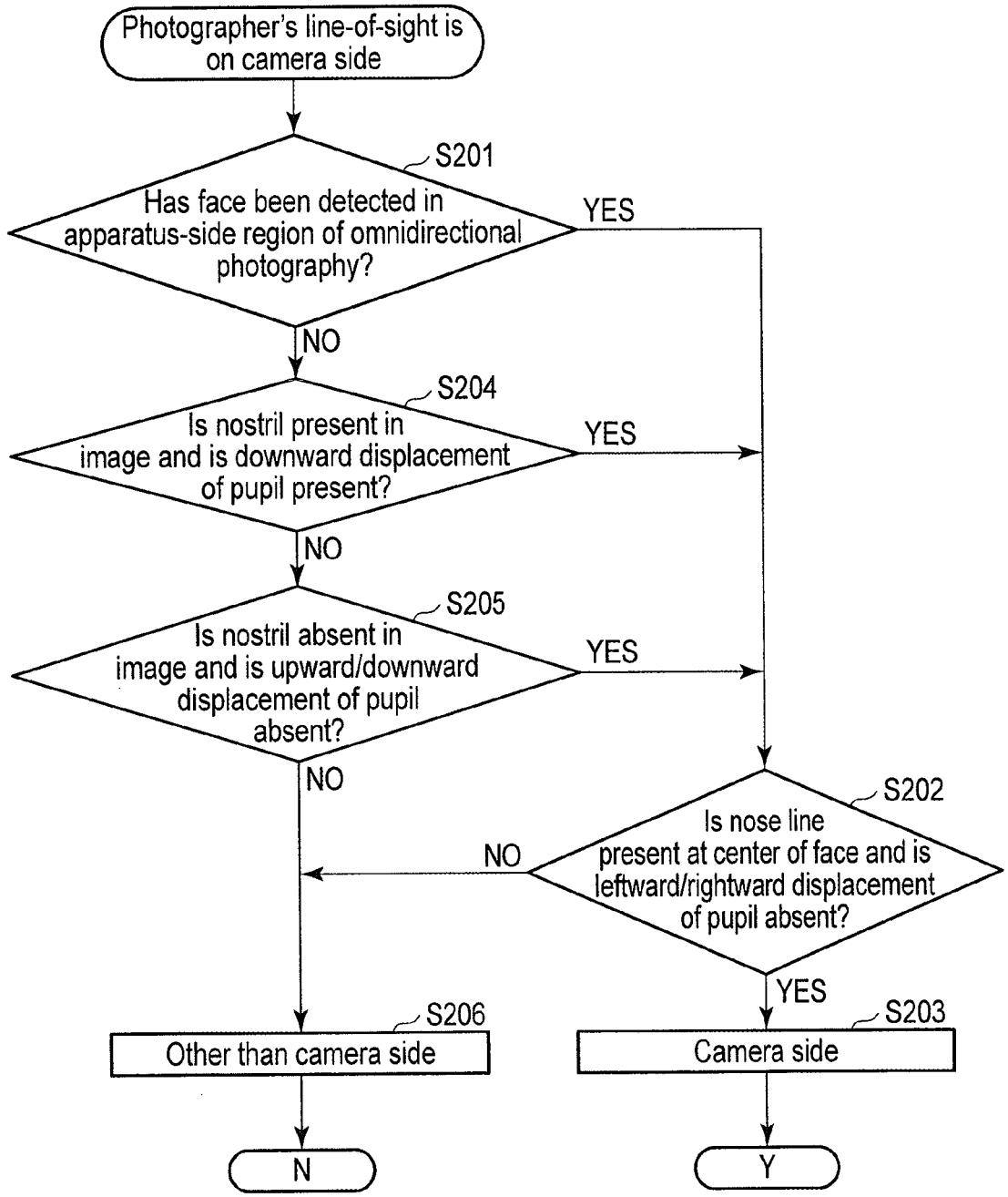
F I G. 13

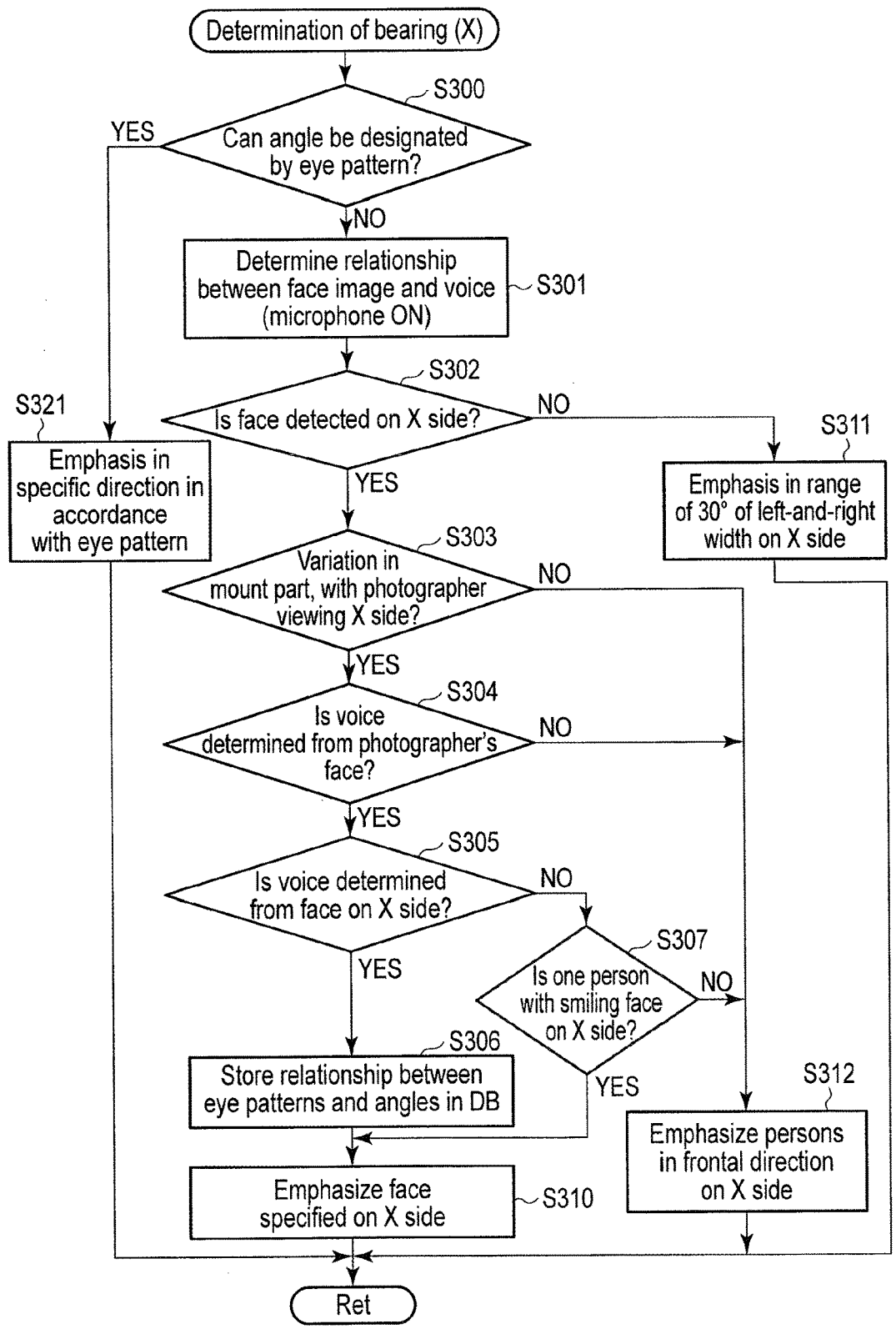
F I G. 14

PHOTOGRAPHING APPARATUS, PHOTOGRAPHING METHOD AND COMPUTER-READABLE STORAGE MEDIUM STORING PHOTOGRAPHING PROGRAM OF PHOTOGRAPHING APPARATUS

CROSS-REFERENCE TO RELATED APPLICATIONS

This application is based upon and claims the benefit of priority from the prior Japanese Patent Application No. 2013-151929, filed Jul. 22, 2013; the entire contents of which are incorporated herein by reference.

BACKGROUND OF THE INVENTION

1. Field of the Invention

The present invention relates to a photographing apparatus and a photographing method for photographing a subject in a wide photographing range, such as an omnidirectional photographing range, an around-view photographing range or a panorama photographing range, and a computer-readable storage medium storing a photographing program of the photographing apparatus.

2. Description of the Related Art

A technique of a photographing apparatus, which photographs a subject in an omnidirectional photographing range, is disclosed in, for example, Jpn. Pat. Appln. KOKAI Publication No. 2011-40898. This publication discloses a photographing/playback apparatus comprising photographing means for photographing a panorama image in over 360° along a predetermined photographing surface; detection means for detecting a direction in which a structural surface of a housing of the photographing/playback apparatus, on which the photographing means is disposed, is opposed; recording means for associating and recording image data of the panorama image, which is obtained by the photographing by the photographing means, and information indicative of the direction detected by the detection means; display means for displaying an image; and display control means for causing the display means to display the panorama image such that a preset reference direction is at a center of the image, based on the information indicative of the direction recorded in association with the image data recorded by the recording means. According to this publication, a person who views a panorama image can easily understand the direction in which a subject appearing in the panorama image was positioned at a time of photographing.

BRIEF SUMMARY OF THE INVENTION

A photographing apparatus according to an aspect of the present invention comprises; a photographing module which simultaneously photographs a range including a main subject located on a front side, and at least an eye part of a photographer located on a rear side; an image processor which acquires image data by executing an image process on an output signal of the photographing module; a line-of-sight direction determination module which determines a line-of-sight direction of the photographer by comparing with the reference line-of-sight direction of the photographer in the image data acquired by the image processor; a main subject determination module which determines the main subject to be photographed by the photographer, based on the line-of-sight direction determined by the line-of-sight direction determination module; and an emphasis processor which executes an emphasis process on the main subject determined by the main subject determination module.

A photographing method according to an aspect of the present invention comprises; simultaneously photographing a range including a main subject located on a front side, and at least an eye part of a photographer located on a rear side; acquiring image data by executing an image process on a photography signal acquired by the photographing; determining a line-of-sight direction of the photographer by comparing with the reference line-of-sight direction of the photographer in the image data; determining the main subject to be photographed by the photographer, based on the line-of-sight direction; and executing an emphasis process on the main subject to be photographed.

A non-transitory computer readable storage medium storing a photographing program of a photographing apparatus, the program comprises: a photographing function of causing the apparatus to simultaneously photograph a range including a main subject located on a front side, and at least an eye part of a photographer located on a rear side; an image process function of causing the apparatus to acquire image data by executing an image process on an output signal of the photographing function; a line-of-sight direction determination function of causing the apparatus to determine a line-of-sight direction of the photographer by comparing with the reference line-of-sight direction of the photographer in the image data acquired by the image processing function; a main subject determination function of causing the apparatus to determine the main subject to be photographed by the photographer, based on the line-of-sight direction determined by the line-of-sight direction determination function; and an emphasis process function of causing the apparatus to execute an emphasis process on the main subject determined by the main subject determination function.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating an embodiment of a photographing apparatus according to the invention.

FIG. 5A is a view illustrating a state at a time of setting a reference line-of-sight direction by the apparatus, based on the presence/absence of a nostril part of a photographer.

FIG. 5B is a view illustrating a state in which the photographer's line-of-sight is directed to a subject, at a time of photography by the apparatus.

FIG. 13 is a flowchart of determination of an apparatus-side line-of-sight direction in the apparatus.

FIG. 14 is a flowchart of determination of the bearing of a line-of-sight direction in the apparatus.

DETAILED DESCRIPTION OF THE INVENTION

Embodiments will be described hereinafter with reference to the accompanying drawings.

FIG. 1 is a block structural diagram of a photographing apparatus 10. This apparatus (camera) 10 includes a photographing optical system 11 for omnidirectional photography. By including the photographing optical system 11, the apparatus 10 photographs a subject in a photographing range of almost all directions of about 360° (hereinafter, "almost all directions" means "omnidirection"), and acquires, for example, a panorama image.

Figure 2:
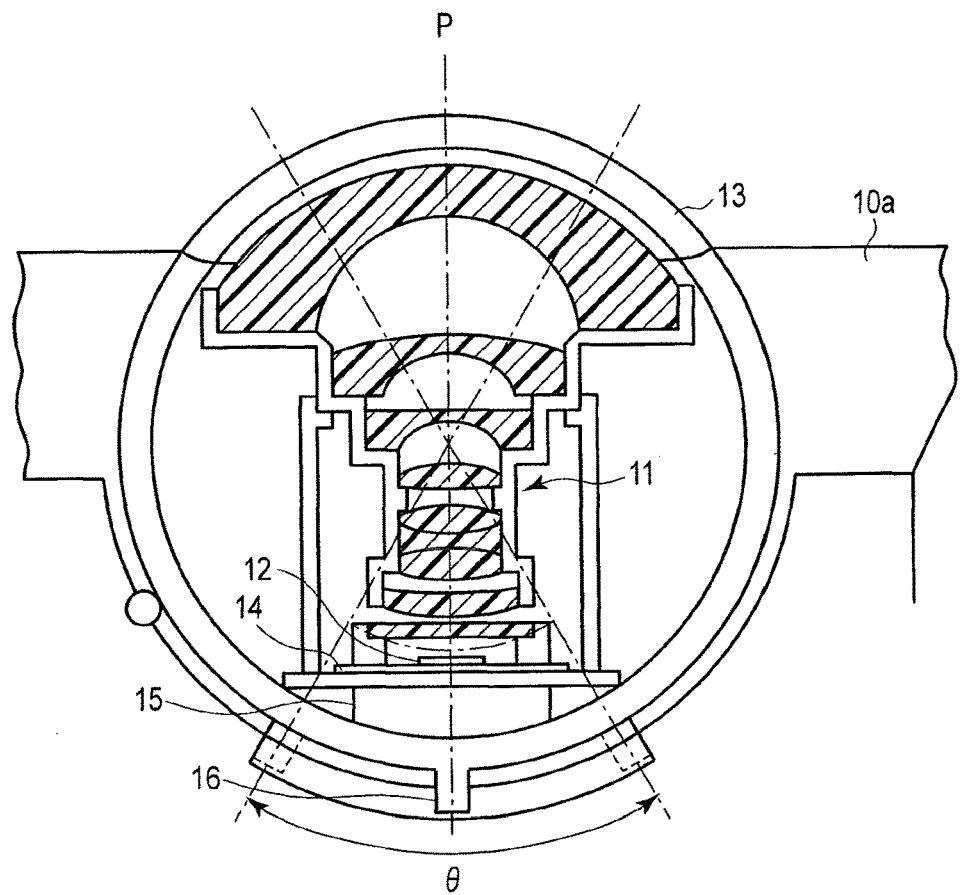
FIG. 2 is a structural view illustrating a photographing optical system in the apparatus.

FIG. 2 is a structural view of the photographing optical system 11. The photographing optical system 11 includes a plurality of lenses which form a super-wide-angle lens such as a fish-eye lens. The photographing optical system 11 focuses light of an omnidirectional photographing area about an optical axis P by the fish-eye lens. This omnidirectional photographing area includes an area corresponding to the optical axis P. The photographing optical system 11 is not limited to an optical system for focusing light of the omnidirectional photographing area by the fish-eye lens, but may be an optical system for focusing light of an annular photographing area about the optical axis P, excluding the central area including the optical axis P. By focusing the light of the annular photographing area, the photographing optical system 11 focuses light of a panorama-like strip-shaped region. The photographing optical system 11 is not limited to a super-wide-angle lens such as a fish-eye lens. In the case of a system in which photography is performed with the optical axis directed to the zenith, as in this apparatus 10, an image of a central part including the optical axis P is not used. Thus, in the case of the photographing system of the apparatus 10, a reflection-type optical system, which acquires a peripheral image of 180° about the optical axis, may be used as the photographing optical system 11. The photographing optical system 11 may be configured to be able to perform all-around view photography by combining a plurality of lenses.

In the present embodiment, it is assumed that "omnidirection" includes an omnidirectional photographing area in the strict sense, and an annular photographing area about the optical axis P. Accordingly, when the fish-eye lens or super-wide-angle lens is assembled in the apparatus (camera) 10, photography is not performed in the omnidirectional photographing area in the strict sense. However, in the embodiment, it is assumed that the omnidirectional photography can be performed.

The photographing optical system 11, as illustrated in FIG. 2, may be fixedly provided on an apparatus body 10a or may be rotatably provided. In the case of the fixed-type, since the attitude of the apparatus 10 is varied by the photographer holding and positioning the apparatus 10, the direction of the optical axis P of the photographing optical system 11 varies in accordance with the variation of the attitude of the apparatus 10. In the case of the rotatable-type, since the photographing optical system 11 is rotatable relative to the apparatus body 10a, the optical axis P of the photographing optical system 11 is directed to the zenith by the gravity or the force of an actuator, without the photographer positioning the optical axis P of the photographing optical system 11 toward the zenith.

In the case of the rotatable-type, the photographing optical system 11 includes a rotary photographing body 13 which is formed, for example, in a spherical shape, as illustrated in FIG. 2. The rotary photographing body 13 is provided rotatable relative to the apparatus body 10a. The photographing optical system 11, a substrate 14 and a weight 15 are provided within the rotary photographing body 13. A photographing module 12 is provided on the substrate 14. The photographing optical system 11, photographing module 12, substrate 14 and weight 15 rotate as one piece together with the rotation of the rotary photographing body 13.

The weight 15 is provided on an extension line of the optical axis P of the photographing optical system 11, at a lower part of the rotary photographing body 13. A gravitational force by the weight 15 acts on the rotary photographing body 13. The rotary photographing body 13 rotates relative to the apparatus body 10a, regardless of the inclination of the apparatus body 10a, and the direction of the optical axis P is kept directed toward the zenith.

If the rotary photographing body 13 is configured to be rotatable, the photographing optical system 11 is directed toward the zenith by the weight 15. Accordingly, even if the photographer does not carefully position the apparatus 10, the optical axis P of the photographing optical system 11 is directed toward the zenith, and so a panorama in a horizontal direction can easily be photographed. The apparatus 10 can be implemented, even without a mechanism such as the rotary photographing body 13, in particular.

If omnidirectional photography is performed in a state in which the optical axis P of the photographing optical system 11 is directed toward the zenith, the face part and eye part of the photographer fall within the photographing area of the photographing optical system 11, and the possibility is high that the face part and eye part of the photographer are photographed. In the present embodiment, in order to perform omnidirectional photography, the photographer performs photography while viewing an image displayed on a front side display module 27 in a state in which the optical axis P of the photographing optical system 11 is directed toward the zenith.

In the case where the rotary photographing body 13 is rotatable, a rotation restriction pin 16 is provided on the extension line of the optical axis P of the photographing optical system 11, at the lower part of the rotary photographing body 13. The rotation restriction pin 16 restricts the rotation of the rotary photographing body 13 within a specific rotational range.

The photographing module 12 is provided on the optical axis P of the photographing optical system 11. The photographing module 12 converts light, which has passed through the photographing optical system 11, to an electric digital signal and outputs the electric digital signal as image data.

The apparatus 10 includes a controller 20 which is composed of a computer. The controller 20 controls the entirety of the apparatus 10. The photographing module 12, a microphone 21, an operation determination module 22, a recording module 24, a communication module 25, an attitude determination module 26, the front-side display module 27, a front-side touch panel 28, a back-side display module 29 and a back-side touch panel 30 are connected to the controller 20. The controller 20 includes an internal memory. A camera (eye sensor) 23, etc. may be provided in the apparatus 10. In the apparatus 10, by the photographer looking at the camera (eye sensor) 23, the image display may be switched to the front-side display module 27 or to the back-side display module 29. The display module provided on the back surface of the apparatus 10 is not limited to the back-side display module 29, and other display modules may be provided.

It is assumed that the front side of the apparatus 10 is the surface side on which the photographing optical system 11 is provided. The front-side display module 27 and front-side touch panel 28 are provided on the front side of the apparatus 10.

The microphone 21 collects a voice in the ambience including a voice of the photographer who operates the apparatus 10 and a voice of a main subject of a person other than the photographer, such as a child, converts the collected voice to an electric signal, and outputs the electric signal as a voice detection signal. Whether or not to collect a voice by the microphone 21 may be automatically selected, for example, in accordance with various photographing modes. A pair of microphones 21 may be provided. In the pair of microphones 21, voices are collected, respectively, and are recorded in stereo.

The operation determination module 22 includes various operation members which are manually operated by the photographer. The operation determination module 22 determines operations on various operation members, and outputs operation determination signals corresponding to the operations. The various operation members include an adjusting member for performing, for example, focus adjustment for a main subject and an operation of an aperture for controlling the brightness of the subject, a release button, a moving picture button, a mode dial, a selection key, and a power button.

The apparatus 10 may be provided with an eyepiece-type electronic view finder (EVF). The EVF may be provided on the apparatus 10 so that the EVF is used in combination with the back-side display module 29. In the apparatus 10, with the combined use of the EVF, the subject can be observed without being affected by ambient light. In the apparatus 10, the back-side camera (eye sensor) 23 and EVF may be provided on the back surface. In the case of this apparatus 10, for example, it is detected whether the eye part of the photographer has approached the EVF within a preset distance. If the eye part of the photographer has approached within the preset distance, the EVF starts operating.

The recording module 24 records, for example, a panorama image acquired by photographing a subject in the omnidirectional photographing range of about 360°, an image of a specific area which is clipped out from the panorama image, and an image including a face part of a photographer A detected by a face detector 41. In the recording module 24, for example, an image dictionary of respective parts in the face part of a human body, such as an eye part, is recorded in advance. The image dictionary includes a plurality of images including shading patterns of the eye part, nose part, mouth part, etc. in the face part. The recording module 24 is, for instance, a memory card.

The communication module 25 executes, between the apparatus 10 and an external apparatus, communication of data including various images acquired by photography of the photographing module 12, and operation signals which are output from the operation determination module 22.

The attitude determination module 26 detects the attitude of the apparatus 10, or a variation of the attitude.

The front-side display module 27 is provided on the front surface of the apparatus 10. The front-side display module 27 displays a live view image, a panorama image acquired by photography, etc. The front-side display module 27 is, for instance, a liquid crystal display or an organic EL display.

The front-side touch panel 28 is provided on the front surface of the front-side display module 27. The front-side touch panel 28 detects pressing by a touch operation of the photographer, and outputs a touch coordinate signal indicative of the position of the touch operation. By this arrangement, the photographer can view display on the front-side display module 27 while photographing the face part by the photographing module 12, or can perform an operation on the front-side touch panel 28.

The front-side touch panel 28 may be configured to have the same function as the release button. For example, if the photographer performs a touch operation on the front-side touch panel 28 in a state in which a live view image is being displayed on the front-side display module 27, the controller 20 detects the touch operation on the front-side touch panel 28 and executes photography control for a subject.

As another function at a time if the photographer has performed a touch operation on the front-side touch panel 28, the controller 20 may perform, in combination, focus adjustment or exposure for a main subject in the image on the front-side display module 27, which corresponds to the touch position.

In the mode in which photography is performed with the optical axis P of the apparatus 10 being directed to the zenith, the front surface of the front-side display module 27 is disposed toward the zenith. The photographer can confirm, for example, a picture composition of the subject, while viewing the image displayed on the front-side display module 27 that is directed toward the zenith.

The apparatus 10 is configured to include the photographing module 12 which simultaneously photographs a range including a subject including a main subject located on the front side, and at least an eye part of the photographer located on the rear side. Thereby, the apparatus 10 can perform an operation to be described below, by the front-side display module 27 disposed in the same direction as the photographing module 12.

In the apparatus 10, both the photographing optical system 11 and the front-side display module 27 are provided on the front surface of the apparatus 10. Accordingly, in the case where the photographer performs omnidirectional photography by disposing the front-side display module 27 toward the zenith, if the photographer directs the line-of-sight to the front-side display module 27, the photographer takes such an attitude as to peer down the front-side display module 27.

If the photographer performs the omnidirectional photography in this attitude, the face part (eye part) of the photographer falls within the photographing range of the photographing optical system 11, and thus the possibility becomes high that the face part (eye part) of the photographer is photographed through the photographing optical system 11. Thereby, since the photographer is displayed in the image displayed on the front-side display module 27, the photographer can confirm himself/herself by viewing the image displayed on the front-side display module 27.

If omnidirectional photography is performed in the state in which the front-side display module 27 is directed toward the zenith, a subject including a main subject such as a family of the photographer, who is on the front side of the photographer, and the photographer himself/herself, are photographed together in the image displayed on the front-side display module 27. In such photographing, even when the family of the photographer, for instance, is present on the front side of the photographer, it is possible to obtain an image including the photographer himself/herself together with the family of the photographer.

In the case of this apparatus 10, an image including as the subject the photographer himself/herself together with the family can be obtained by one-time photographing, and photography, which is convenient and pleasant for the photographer, can be performed.

In the apparatus 10, in the case where the photographer performs photography by directing the line-of-sight to the image displayed on the back-side display module 29, a subject is present on the extension line of the light-of-sight direction of the photographer on the back-side display module 29, and the subject is photographed. In this case, the apparatus 10, like an ordinary camera, is applicable without difficulty to such a use that the viewer photographs a subject on the front side by holding the apparatus 10.

The apparatus 10 can be reduced in size and thickness by increasing the size of the front surface and providing the photographing optical system 11 and front-side display module 27 on the front surface.

The apparatus 10 can also be used for so-called "selfie", which is photography performed with the optical axis P of the photographing optical system 11 being directed to the photographer himself/herself.

The apparatus 10 is not limited to the case in which the image photographed through the photographing optical system 11 is displayed on the front-side display module 27 which is provided on the same surface (front surface) as the surface on which the photographing optical system 11 is provided. The image photographed through the photographing optical system 11 may be displayed on the back-side display module 29 which is provided on the surface side opposite to the front-side display module 27.

The back-side display module 29 may be provided such that the back-side display module 29 is rotatable about one side thereof as a rotational axis, relative to the apparatus 10. If an image is displayed on such back-side display module 29, it is possible to obtain the same advantageous effects as in the case where the image, in which the photographer himself/herself is included in the subject, is displayed on the front-side display module 27.

The back-side display module 29 is provided on the back surface of the apparatus 10. The back-side display module 29 displays a live view image, a panorama image acquired by photographing, etc. The back-side display module 29 is, for example, a liquid crystal display or an organic EL display. The back-side display module 29 is not mainly used in the apparatus 10.

The back-side touch panel 30 is provided on the front surface of the back-side display module 29. The back-side touch panel 30 detects pressing by a touch operation of the photographer, and outputs a touch coordinate signal indicative of the position of the touch operation. Like the front-side touch panel 28, the back-side touch panel 30 may be configured to function such that, for example, a release switch has been operated by a touch operation, when the photographer has performed this touch operation on the back-side touch panel 30 in a state in which a live view image is being displayed on the back-side display module 29.

The display operation of either the front-side display module 27 or the back-side display module 29 may automatically be selected in accordance with, for example, various photographing modes, or may be selectively executed in accordance with, for example, the attitude of the apparatus 10.

The controller 20 includes an internal memory or the like. A photographing program is prestored in the apparatus 10. A photographing result may be recorded in the internal memory or the like. By executing the photographing program, the controller 20 realizes the following functions. The photographing program realizes a function of causing the controller 20, which is composed of a computer, to photograph a range including a subject including a main subject and at least an eye part of a photographer; an image process function of causing the controller 20 to image-process an output signal of the photographing function and to acquire image data; a line-of-sight direction determination function of causing the controller 20 to determine the line-of-sight direction of the photographer in the image data acquired by the image process function; a main subject determination function of causing the controller 20 to determine the main subject which is to be photographed by the photographer, based on the line-of-sight direction determined by the line-of-sight direction determination function; and an emphasis process function of causing the controller 20 to execute an emphasis process on the main subject determined by the main subject determination function.

The emphasis process of the main subject will be described.

Figure 3A:
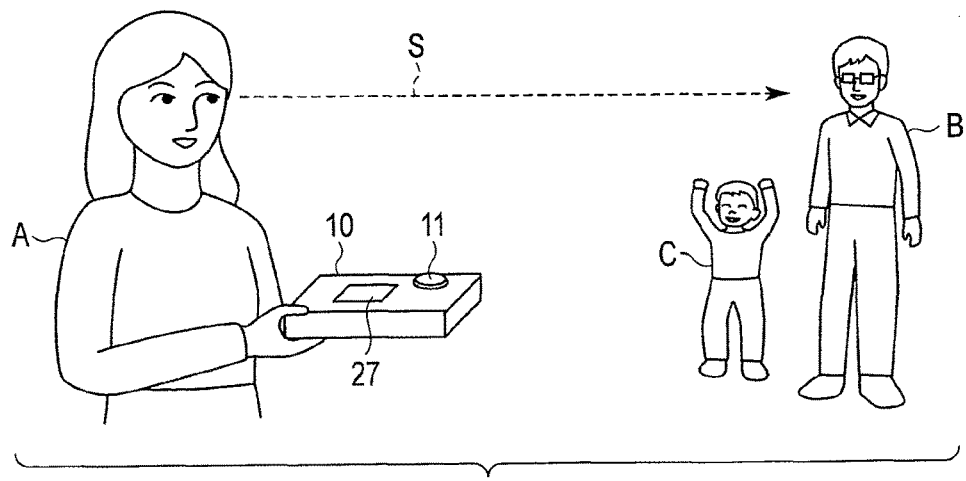
FIG. 3A is a view illustrating a state in which omnidirectional photography is performed at a time of acquiring a panorama image by photographing of the apparatus.
Figure 3B:
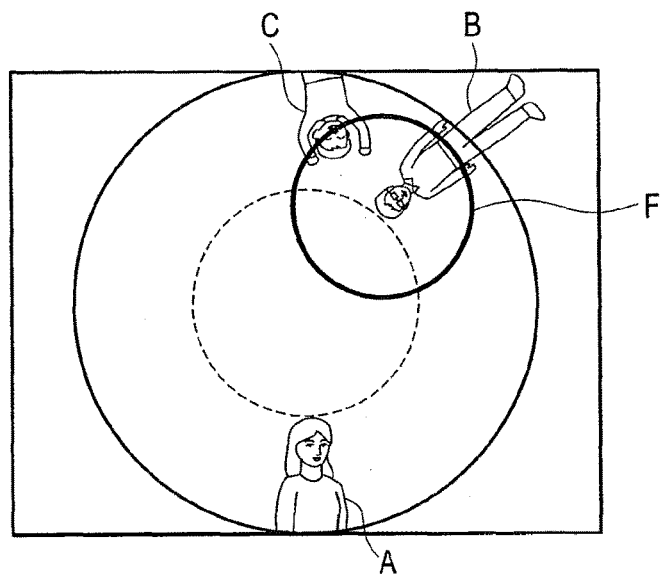
FIG. 3B is a view illustrating a photographing result of omnidirectional photography by the apparatus.
Figure 3C:
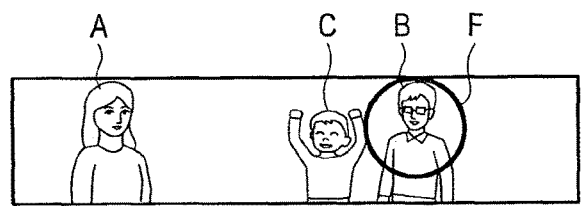
FIG. 3C is a view illustrating a panorama image acquired by the apparatus.

FIG. 3A, FIG. 3B and FIG. 3C are views for acquiring a panorama image by photographing of the apparatus 10. FIG. 3A illustrates a state in which omnidirectional photography is performed. FIG. 3B illustrates a photographing result. FIG. 3C illustrates a panorama image into which the photographing result is processed. An image, which is obtained by clipping out a necessary portion from the omnidirectional image and is displayed with a large width, becomes a panorama image. The definition of a large width or a panorama is, for example, an image with a larger horizontal length, compared to the aspect ratio of the front-side touch panel 28 or back-side touch panel 30 of the apparatus 10, or an image with a horizontal length which is, for example, double or more greater than a vertical length.

FIG. 3A illustrates a state in which three persons are photographed by omnidirectional photography, namely a photographer A who is the photographer himself/herself, a person (hereinafter referred to as "father") B such as a father as a main subject, and a person (hereinafter referred to as "child") C such as a child. It is assumed that a line-of-sight direction of the photographer A is directed to the father B.

If omnidirectional photography is performed in the state illustrated in FIG. 3A, a circular photography result corresponding to an image circle of the photographing optical system 11, as illustrated in FIG. 3B, is obtained. In FIG. 3B, a main subject to be photographed by the photographer A, that is, the father B and the child C in this example, is determined based on the line-of-sight direction S of the photographer A, and a circular index F is added in order to display with emphasis the father B and the child C.

FIG. 3C is a view in which an annular index F is added in order to display with emphasis the father B, also on a panorama image.

The controller 20 executes control for realizing emphasis display of the main subject. The controller 20 includes an image processor 40, a face detector 41, a line-of-sight direction determination module 42, a main subject determination module 43, an emphasis display module 44, display controller 45, and a voice detector 46.

The image processor 40 receives image data of omnidirectional photography, which is output from the photographing module 12, and executes an image process, such as white balance correction or gamma correction, on the image data.

The face detector 41 detects a face part of a person, such as the photographer A, from the image data of, for example, omnidirectional photography acquired by the photography of the photographing module 12. Specifically, the face detector 41 reads out shading patterns of respective parts in the face part, such as an eye part, a nose part and a mouth part, of the image dictionary that is pre-recorded in the recording module 24. The face detector 41 compares the image data of omnidirectional photography and the shading patterns of respective parts in the face part, such as an eye part, a nose part and a mouth part, of the image dictionary that is pre-recorded in the recording module 24. Based on the comparison result, the face detector 41 detects a face part and the respective parts in the face part, such as an eye part, a nose part and a mouth part, from the image data acquired by the photography of the photographing module 12.

The line-of-sight direction determination module 42 detects, for example, the position or size of the white of the eye or the pupil of the eye part, and the position of the white of the eye or the pupil, for instance, the left/right/up/down position of the pupil, from among the face part and the respective parts such as the eye part, nose part and mouth part in the face part detected by the face detector 41. Based on the detection result of, e.g. the left/right/up/down position of the pupil, the line-of-sight direction determination module 42 detects the line-of-sight direction.

Specifically, the line-of-sight direction determination module 42 receives an image of the face part of a person, namely the photographer A in this example, in the image data of omnidirectional photography detected by the face detector 41. Based on at least either or both of the presence/absence of a nostril part and a pupil position of the eye part, the line-of-sight direction determination module 42 determines the line-of-sight direction S. As regards the determination of the photographer A, the determination can be made from the direction or area of the face image photographed as described above, and the owner of the camera may be determined as a result of face detection. If the detection of the face part is possible, the position of the eye part can also be determined from the shading pattern of the face part.

The determination of the direction-of-sight direction S will be concretely described.

The line-of-sight direction determination module 42 determines whether the line-of-sight direction S of the photographer A is on the apparatus 10 side or not. That the line-of-sight direction S is on the apparatus 10 side means that the photographer A directs the line-of-sight to the apparatus 10. As a result of determination, if the line-of-sight direction S is on the apparatus 10 side, the line-of-sight direction determination module 42 sets the line-of-sight direction S on the apparatus 10 side to be an original point direction (reference line-of-sight direction) G, as illustrated in FIG. 4.

After setting the reference line-of-sight direction G, the line-of-sight direction determination module 42 compares the reference line-of-sight direction G and the subject targeting line-of-sight direction S of the photographer A, based on the position of the white of the eye or the position of the pupil, and determines the line-of-sight direction S of the photographer A when line-of-sight direction determination module 42 determines the line-of-sight direction S of the photographer A is not on the apparatus 10 side.

Specifically, if the photographer A is to perform panorama photography centering on the photographer A himself/herself and the father B and the child C, the photographer A first directs the line-of-sight to the father B and the child C, as illustrated in FIG. 3A, and makes the father B and the child C and the photographer A himself/herself fall within the photographing range of the apparatus 10. Thereafter, as illustrated in FIG. 4, the photographer A directs the line-of-sight to the live view image displayed on the front-side display module 27, and confirms that the father B and the child C and the photographer A himself/herself are within the photographing range of the apparatus 10. Then, the photographer A performs a pressing operation of the release button of the apparatus 10 or performs a touch operation on the touch panel 28 on the front-side display module 27, and thereby the apparatus 10 executes a photographing operation, acquires a photography result as shown in FIG. 3B, and acquires a panorama image as shown in FIG. 3C.

Figure 4:
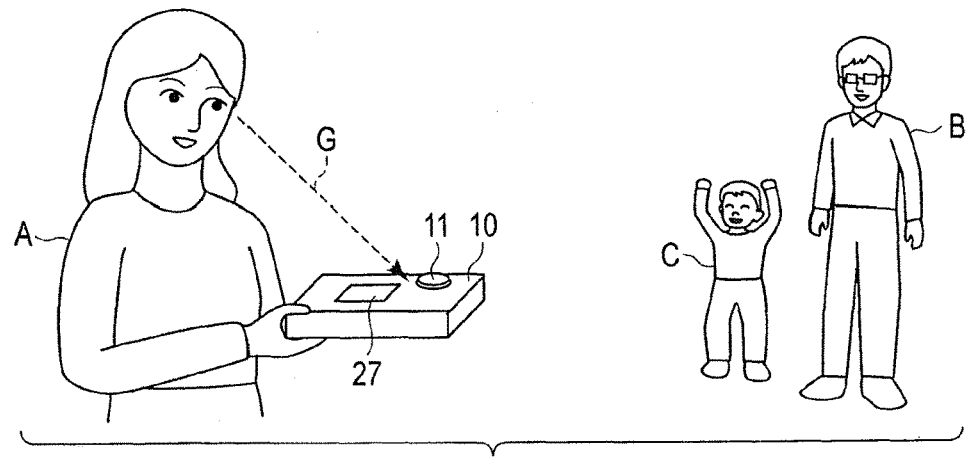
FIG. 4 is a view for explaining the setting of a reference line-of-sight direction in the apparatus.

Accordingly, if the photographer A has directed the line-of-sight direction S from the father B and the child C to the apparatus 10, as illustrated in FIG. 4, the line-of-sight direction determination module 42 sets the line-of-sight direction S as the reference line-of-sight direction G. This line-of-sight direction S cannot exactly determine the line-of-sight direction S itself. This line-of-sight direction S is estimated based on the disposition or relative variation of the white of the eye and the pupil.

After setting the reference line-of-sight direction G, the line-of-sight direction determination module 42 compares the reference line-of-sight direction G and the line-of-sight direction S of the photographer A, and determines the line-of-sight direction S of the photographer A.

In the determination of the line-of-sight direction S of the photographer A, the line-of-sight direction determination module 42 determines whether the line-of-sight direction (a variation of the position of the pupil in the eye part, or a difference in ratio between the white of the eye and the pupil) S of the photographer A is on the left side, right side, or front side, relative to the reference line-of-sight direction G, based on the comparison result between the reference line-of-sight direction G and the line-of-sight direction S of the photographer A. The determination of the line-of-sight direction S of the photographer A may be executed by observing a variation of the position of the pupil (or the position of the white of the eye) with reference to a pattern of the line of the nose, the nostrils, or a pattern of lines of the face part. The determination of the line-of-sight direction S of the photographer A may be executed by setting a reference position of the white of the eye and the pupil, and by determining a direction of view, based on a difference from the reference position.

The line-of-sight direction determination module 42 determines whether there is a conversation between the photographer A and a main subject such as a person, based on a main subject such as a person existing in the determined line-of-sight direction S of the photographer A, a voice of the photographer A and the main subject such as a person, which is detected by the voice detector 46, and each of images of the photographer A and the main subject such as a person. As a result of this determination, if there is a conversation, the line-of-sight direction determination module 42 associates the pupil position of the photographer A and the determined line-of-sight direction S of any one of the left side, right side and front side, and stores the data of this association in the internal memory, etc. The data of the association may be recorded in the recording module 24 such as a memory card.

A description will now be given of an example of the setting of the reference line-of-sight direction G of the line-of-sight direction S of the photographer A and the determination of the line-of-sight direction S of the photographer A.

The line-of-sight direction determination module 42, as described above, determines the line-of-sight direction S, based on either or both of the presence/absence of a nostril part in the face part of the photographer A in the image data of omnidirectional photography acquired by the image processor 40, and the pupil position of both eye parts. A concrete example of the determination of the line-of-sight direction S will be described below.

FIG. 5A illustrates that the line-of-sight direction S of the photographer A is directed to the front-side display module 27. This line-of-sight direction S is substantially equal to a line-of-sight which is directed to the photographing optical system 11 of the apparatus 10. When the line-of-sight direction S of the photographer A is directed to the front-side display module 27 of the apparatus 10, this line-of-sight direction S is set to be the reference line-of-sight direction G. The face part of the photographer A at this time is wholly directed downward. Thus, the nostril part of the face part of the photographer A is hardly photographed in the image data of omnidirectional photography captured by the photographing module 12 through the photographing optical system 11 of the apparatus 10.

By contrast, FIG. 5B illustrates that the line-of-sight direction S of the photographer A is directed to the father B and the child C, as illustrated in FIG. 3A. The face part of the photographer A at this time is wholly directed upward. Thereby, the nostril part of the photographer A is photographed in the image data of omnidirectional photography captured by the photographing module 12 through the photographing optical system 11 of the apparatus 10.

Accordingly, if the nostril part of the photographer A is not photographed in the image data of omnidirectional photography captured by the image processor 40, as illustrated in FIG. 5A, the line-of-sight direction determination module 42 determines that the line-of-sight direction S of the photographer A is directed to the front-side display module 27 of the apparatus 10. The line-of-sight direction determination module 42 sets this line-of-sight direction S to be the reference line-of-sight direction G.

If the nostril part of the photographer A is photographed in the image data of omnidirectional photography captured by the image processor 40, as illustrated in FIG. 5B, the line-of-sight direction determination module 42 determines that the line-of-sight direction S of the photographer A is directed to the father B and the child C, and does not set the reference line-of-sight direction G.

Next, a description is given of a concrete example at a time when the line-of-sight direction S is determined by the line-of-sight direction determination module 42, based on the pupil position of the eye part in the face part of the photographer A in the image data.

Figure 6A:
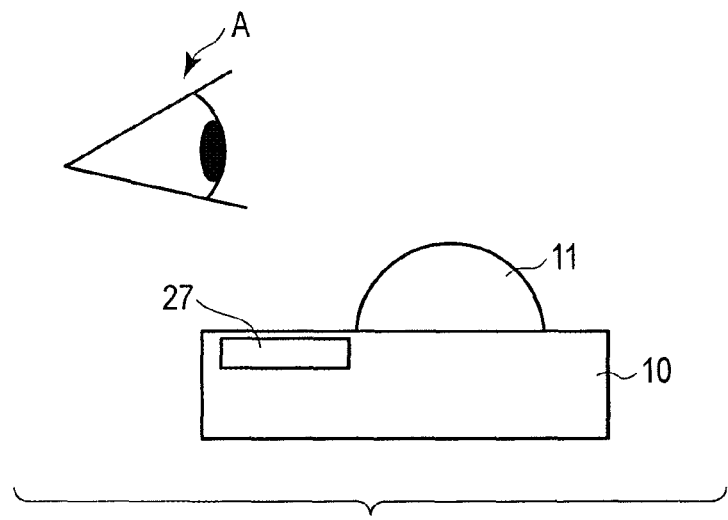
FIG. 6A is a view illustrating a state at a time of determining a pupil position of the photographer by the apparatus.

FIG. 6A illustrates that the line-of-sight direction S of the photographer A is directed to the father B and the child C. At this time, the pupil and the white of the eye around the pupil in the eye part of the photographer A are photographed in the image data of omnidirectional photography captured by the photographing module 12 through the photographing optical system 11 of the apparatus 10.

Figure 6B:
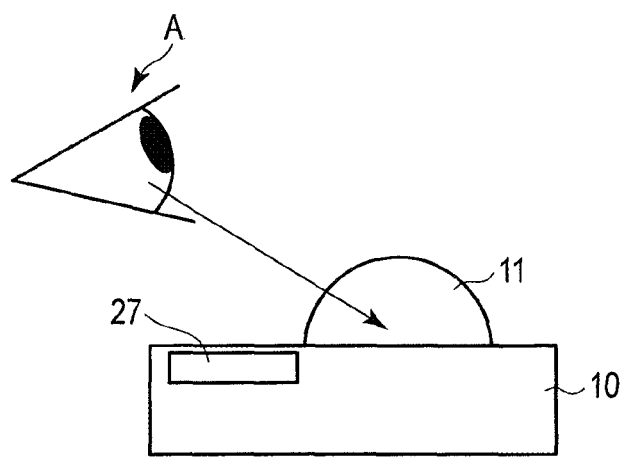
FIG. 6B is a view illustrating a state at a time of determining the pupil position of the photographer by the apparatus.

FIG. 6B illustrates that the line-of-sight direction S of the photographer A is directed upward from the father B and the child C. At this time, in the image data of omnidirectional photography captured by the photographing module 12, the pupil and the white of the eye in the eye part of the photographer A are photographed in two areas, for example, in two such areas that the pupil position is above and the white position is below.

Figure 6C:
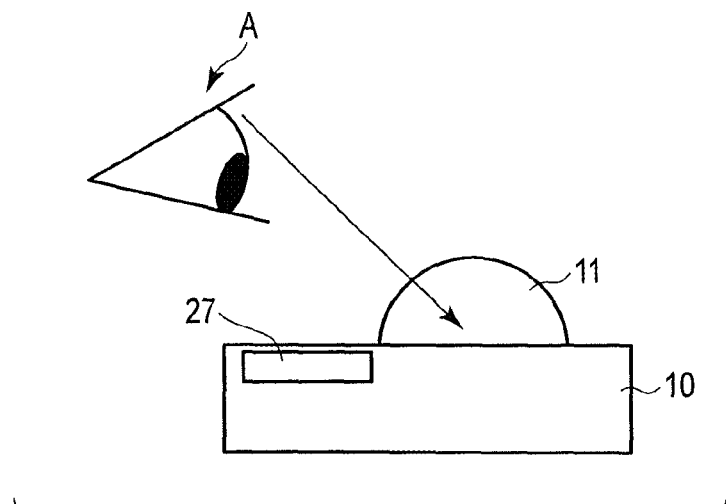
FIG. 6C is a view illustrating a state at a time of setting the reference line-of-sight direction, based on the pupil position of the photographer, by the apparatus.

FIG. 6C illustrates that the line-of-sight direction S of the photographer A has been determined to be directed to the front-side display module 27, and the line-of-sight direction S has been set to be the reference line-of-sight direction G. At this time, in the image data of omnidirectional photography captured by the photographing module 12, the pupil and the white of the eye in the eye part of the photographer A are photographed in two areas, for example, in two such areas that the pupil position is below and the white position is above.

Accordingly, if the pupil and the white of the eye are photographed, for example, in two such areas that the pupil position is below and the white position is above in the image data of omnidirectional photography acquired by the image processor 40, as illustrated in FIG. 6C, the line-of-sight direction determination module 42 determines that the line-of-sight direction S of the photographer A is directed to the front-side display module 27, and sets the line-of-sight direction S at this time to be the reference line-of-sight direction G. Incidentally, in the states shown in FIG. 6A and FIG. 6B, the setting of the reference line-of-sight direction G is not executed.

Next, a description is given of a concrete example at a time of determining, by the line-of-sight direction determination module 42, whether the line-of-sight direction of the photographer A is on the left side, right side or front side, relative to the reference line-of-sight direction G.

Figure 7A:
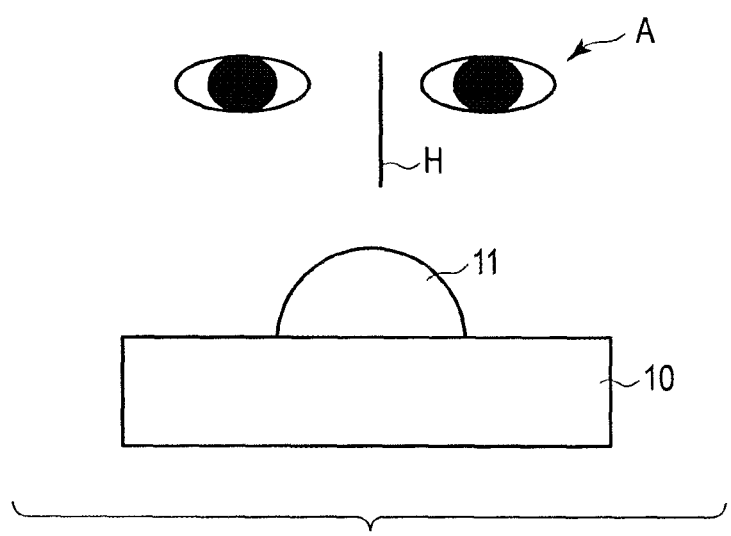
FIG. 7A is a view illustrating that the photographer's line-of-sight direction is on a front side in the apparatus.
Figure 7B:
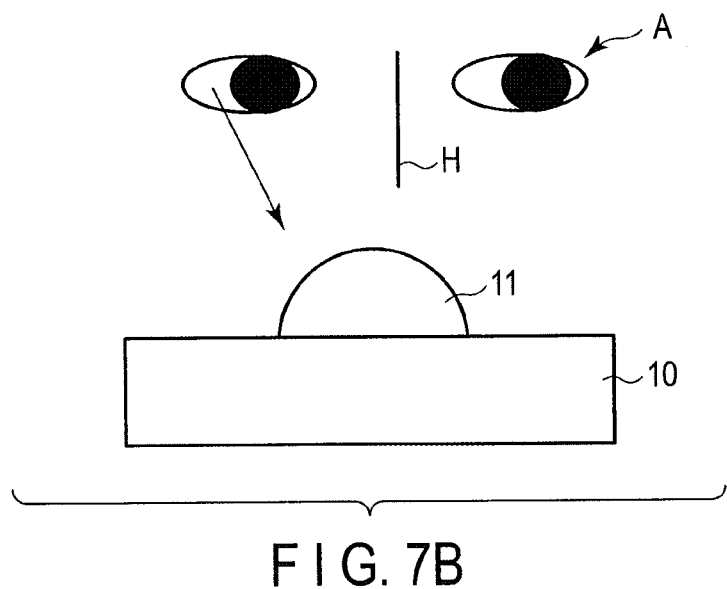
FIG. 7B is a view illustrating that the photographer's line-of-sight direction is on the left side in the apparatus, as viewed from the photographer himself/herself.
Figure 7C:
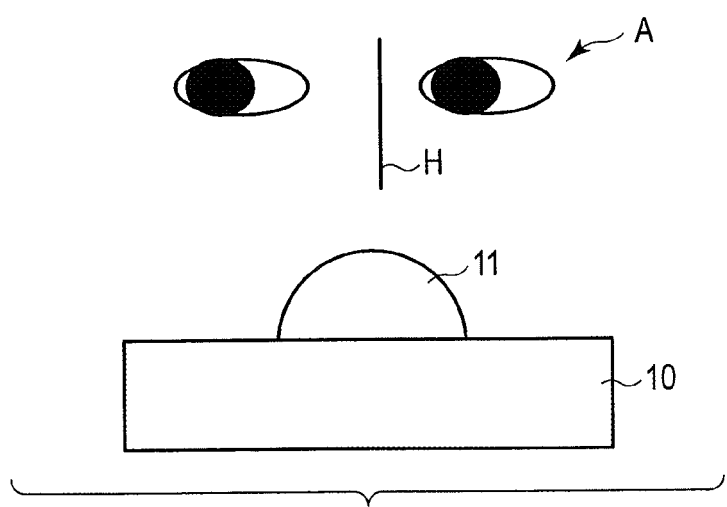
FIG. 7C is a view illustrating that the photographer's line-of-sight direction is on the right side in the apparatus, as viewed from the photographer himself/herself.

FIG. 7A, FIG. 7B and FIG. 7C illustrate cases in which the face part of the photographer A is directed to the front, and only the pupils of the eye parts are directed forward, leftward (left side) and rightward (right side). FIG. 7A illustrates that the line-of-sight direction S of the photographer A is on the front side. The photographer A is photographed in the state in which the photographer A faces frontward, relative to the photographing optical system 11 of the apparatus 10. A nose line H of the nose part of the photographer A exists between both eye parts.

Since the pupils are positioned at the centers of the eye parts on the image data of omnidirectional photography acquired by the image processor 40 and the white parts of the eye are substantially equally photographed on both left and right sides of the pupil, the line-of-sight direction determination module 42 determines that the line-of-sight direction S of the photographer A exists on the front side.

FIG. 7B illustrates that the line-of-sight direction S of the photographer A exists on the left side, as viewed from the photographer A himself/herself. Since the pupils are positioned on the right side of the eye parts on the image data of omnidirectional photography acquired by the image processor 40 and the white of the eye is photographed on the left side of the pupil, the line-of-sight direction determination module 42 determines that the line-of-sight direction S of the photographer A exists on the left side, as viewed from the photographer A himself/herself.

FIG. 7C illustrates that the line-of-sight direction S of the photographer A exists on the right side, as viewed from the photographer A himself/herself. Since the pupils are positioned on the left side of the eye parts on the image data of omnidirectional photography acquired by the image processor 40 and the white of the eye is photographed on the right side of the pupil, the line-of-sight direction determination module 42 determines that the line-of-sight direction S of the photographer A exists on the right side, as viewed from the photographer A himself/herself.

Figure 8A:
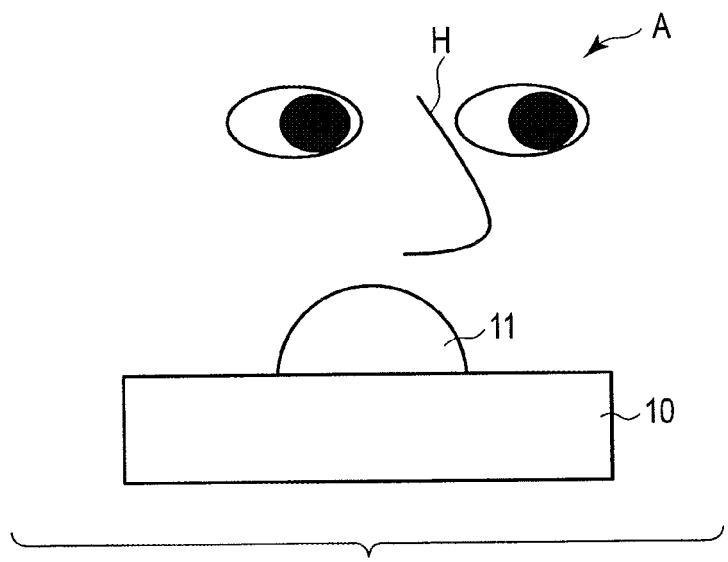
FIG. 8A is a view illustrating that the photographer's line-of-sight direction is on the left side in the apparatus, as viewed from the photographer himself/herself.
Figure 8B:
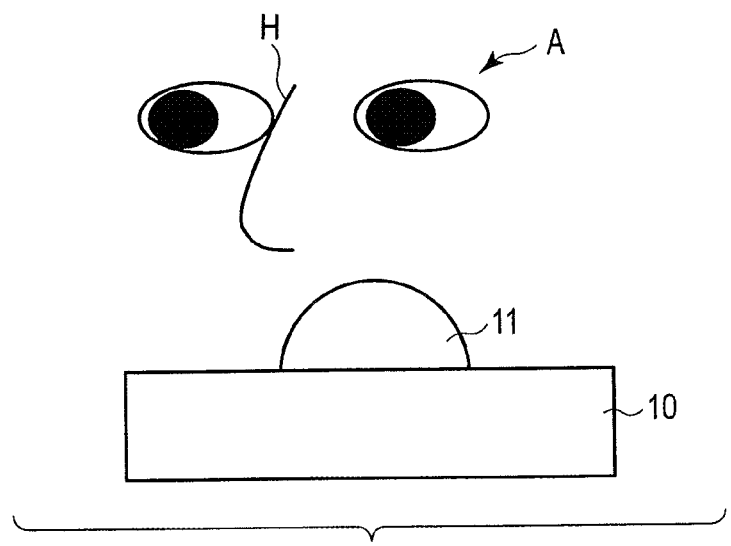
FIG. 8B is a view illustrating that the photographer's line-of-sight direction is on the right side in the apparatus, as viewed from the photographer himself/herself.

FIG. 8A and FIG. 8B illustrate cases in which the face part of the photographer A is directed sideward and the pupils of the eye parts are directed leftward (left side) and rightward (right side). FIG. 8A illustrates that the line-of-sight direction S of the photographer A exists on the left side, as viewed from the photographer A himself/herself. Since the pupils are positioned on the right side of the eye parts on the image data of omnidirectional photography acquired by the image processor 40 and the white of the eye is photographed on the left side of the pupil, the line-of-sight direction determination module 42 determines that the line-of-sight direction S of the photographer A exists on the left side, as viewed from the photographer A himself/herself.

FIG. 8B illustrates that the line-of-sight direction S of the photographer A exists on the right side, as viewed from the photographer A himself/herself. Since the pupils are positioned on the left side of the eye parts on the image data of omnidirectional photography acquired by the image processor 40 and the white of the eye is photographed on the right side of the pupil, the line-of-sight direction determination module 42 determines that the line-of-sight direction S of the photographer A exists on the right side, as viewed from the photographer A himself/herself.

The main subject determination module 43 determines, based on the line-of-sight direction S determined by the line-of-sight direction determination module 42, a main subject in a subject to be photographed by the photographer A, for example, the father B and the child C as illustrated in FIG. 3B and FIG. 3C, which exists on an extension line of the line-of-sight direction S.

The main subject determination module 43 determines that the line-of-sight direction S of the photographer A is on the apparatus 10 side, if the nostril part of the photographer A is present, the pupil position is downward and there is no displacement with respect to the nose line and pupil position of the photographer A, or if there is no upward/downward displacement of the pupil position and there is no displacement with respect to the nose line and pupil position of the photographer A, despite the nostril part of the photographer A being absent.

The emphasis display module 44 displays with emphasis the main subject determined by the main subject determination module 43. Specifically, the emphasis display module 44 executes an image process for emphasis on the main subject in the image data acquired by the image processor 40, for example, an image area corresponding to the father B and the child C as shown in FIG. 3B or FIG. 3C. The image process for emphasis executes at least one of a process of adding an index for emphasis to the main subject, such as the father B and the child C, a process of altering the position of disposition of the main subject, and a process of relatively varying the density level of the area corresponding to the main subject.

For example, as illustrated in FIG. 3B and FIG. 3C, the index F for emphasis displays with emphasis the father B and the child C on the panorama image. The index F is formed in an annular shape. The shape of the index F is not limited to the annular shape, but may be an oval shape, a rectangular shape, etc. The index F may change the position of disposition on the image data of the main subject such as the father B and the child C. The index F may vary the density level of the area of the main subject such as father B and the child C, and may increase, for example, the luminance of this area. The index F may execute an image process on the main subject such as the father B and the child C, such that a spotlight is radiated on the main subject. The index F may lower the contrast, or may vary the exposure.

Figure 9:
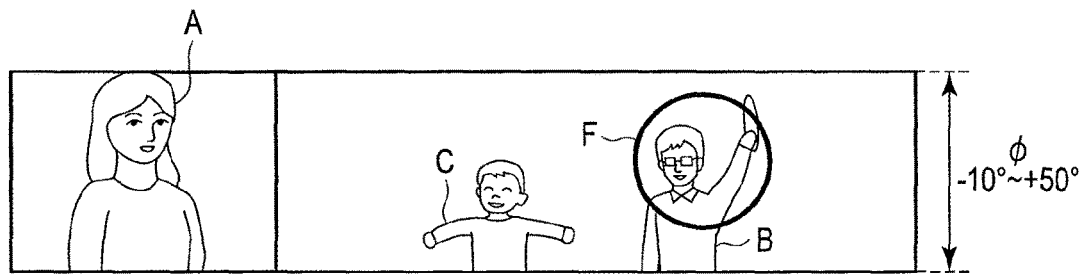
FIG. 9 is a view illustrating the setting of an angle φ of a vertical width in a panorama image acquired by the apparatus.

In the emphasis display module 44, an emphasis range for emphasis-displaying the main subject in the image data of omnidirectional photography is set up. In FIG. 9, a vertical width of image data of omnidirectional photography acquired by the apparatus 10, for example, a vertical width in a panorama image, is set at an angle φ. The angle φ of the vertical width is set up such that, for example, when photographing is performed by disposing the apparatus 10 at a height position of the bust of the father B of the main subject, the angle φ is set in an angle range (−10°~50°=60°) between −10° on the lower side and 50° on the upper side, relative to a horizontal line connecting the apparatus 10 and the height position of the bust of the father B. If the range for emphasis by the index F is set at this angle range (−10°~50°=60°), the area for emphasis is not clearly understandable. Thus, the range of emphasis is set at, for example, half the angle range of 60°, i.e. 30°.

Figure 10:
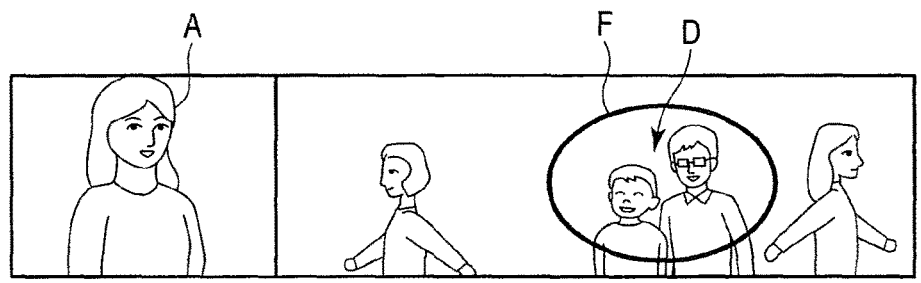
FIG. 10 is a view illustrating the setting of an emphasis range for a group of persons comprising a plurality of persons by the apparatus.

For example, in the case where the index F is formed in an oval shape, when a group of persons D comprising a plurality of persons as illustrated in FIG. 10 have been photographed, the range for emphasis is set at 25° on the upper side and at 10° on the lower side, relative to the central part of the group of persons D.

In this manner, the front-side display module 27 is provided between the photographing module 12 and the photographer. The front-side display module 27 can display an image corresponding to image data and a determination result of the main subject determination module 43. By viewing the determination result of the main subject determination module 43, the photographer can confirm whether the photographer's intension is correctly reflected. While the photographer is looking at a subject or an object, it is difficult for the photographer to view the display on the front-side display module 27 or the like at the same time. Such a device may be made that a result of viewing of the subject by the photographer is recorded and this result is kept displayed for a while. The fact that the photographer has viewed the display on the front-side display module 27 may be detected, and display with emphasis may be effected.

Figure 11:
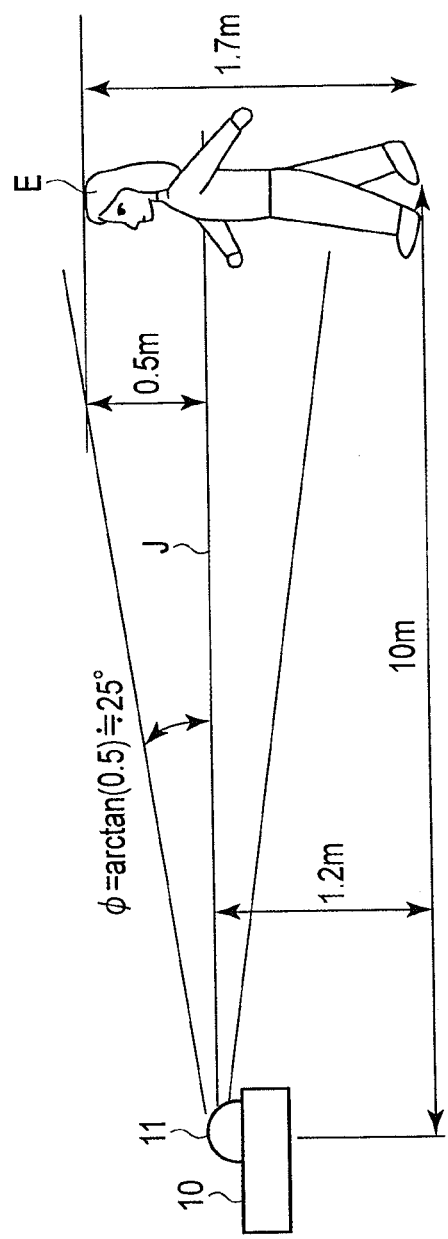
FIG. 11 is a view for explaining grounds for the setting of the emphasis range by an index in the apparatus.

Next, referring to FIG. 11, a description is given of the grounds for the setting of the emphasis range by the index F.

It is assumed that the photographer A holds the apparatus 10 and photographs the main subject such as a person E at a height of, for example, 1.2 m from the ground. It is assumed that the body height of the person E is, for example, 1.7 m, and photography is performed with a distance of, for example, 1 m between the apparatus 10 and the person E. It is assumed that the height position of the photographing optical system 11 of the apparatus 10 corresponds, in a horizontal direction J, to the height position of the bust of the person E.

Under these conditions, in order to photograph the person E by the apparatus 10 and to make the bust part to the face part of the person E fall within the photographing range, an angle $\phi$ (=25°) on the upper side relative to the horizontal direction J is necessary. Incidentally, $\phi$=arc tan(0.5)≈25°. However, if only the bust part to face part of the person E are photographed, the background of the person E is absent, which is not suited to the viewing of an image. Thus, the angle $\phi$ is doubled, and an angle of 50° on the upper side is set.

If no voice is detected by the voice detector 46 and the line-of-sight direction determination module 42 determines that the main subject is a group of persons comprising a plurality of persons, the emphasis display module 44 executes emphasis display for the group of persons.

The display controller 45 causes either or both of the front-side display module 27 and back-side display module 29 to display the image data of omnidirectional photography acquired by the image processor 40, for example, a live view image or a panorama image.

The voice detector 46 receives a voice detection signal which is output from the microphone 21, and detects a voice in the ambience including a voice of the photographer and a voice of a main subject such as a person other than the photographer.

Figure 12:
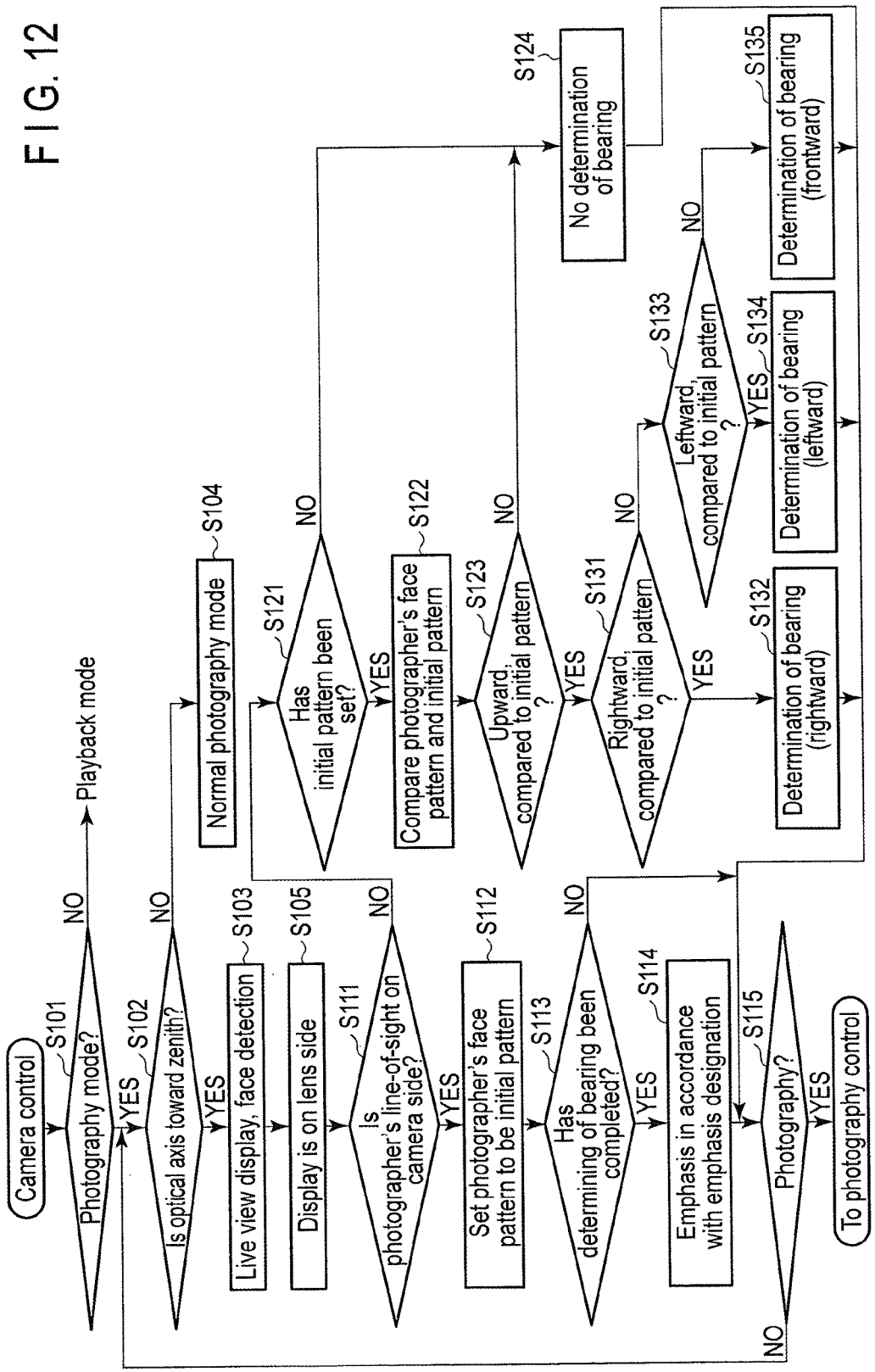
FIG. 12 is a camera control flowchart in the apparatus.

Next, the operation of the apparatus with the above-described structure is described with reference to a camera control flowchart shown in FIG. 12.

In step S101, the controller 20 determines whether a photography mode is set or not. As a result of the determination, if the photography mode is set, the controller 20 determines in step S102 whether the rotary photographing body 13 including the photographing optical system 11 is directed to the zenith or not. In other words, the controller 20 determines whether omnidirectional photography is to be executed or not.

As a result of the determination, if the rotary photographing body 13 is directed to the zenith, the controller 20 causes, in step S103, either or both of the front-side display module 27 and the back-side display module 29 to display a live view image of the subject, etc. Specifically, the photographing optical system 11 focuses light of an annular photographing area about the optical axis P by a plurality of lenses functioning as a fish-eye lens. The photographing module 12 converts the light focused by the photographing optical system 11 to an electric analog signal, and converts the analog signal to a digital signal, thus producing image data of omnidirectional photography. The image processor 40 receives the image data which is output from the photographing module 12, and executes an image process, such as white balance correction or gamma correction, on the image data. The display controller 45 causes either or both of the front-side display module 27 and back-side display module 29 to display the image data of omnidirectional photography acquired by the image processor 40, for example, a live view image in this case.

As a result of the determination in step S101, if a mode other than the photography mode, for example, a playback mode, is set, the controller 20 transitions to the playback mode. As a result of the determination in step S102, if the rotary photographing body 13 including the photographing optical system 11 is not directed to the zenith, the controller 20 transitions to a normal photography mode in step S104.

In step S105, the controller 20 determines whether the live view image is being displayed by the front-side display module 27 or not. In other words, the controller 20 determines whether the display module, on which the live view image is being displayed, is the front-side display module 27 which is provided on the same surface (front surface) as the surface on which the photographing optical system 11 is provided. If it is determined that the display module, which is displaying the live view image, is the back-side display module 29, the controller 20 switches the display of the live view image to the front-side display module 27.

In step S111, if the photographer A is included in the image data of omnidirectional photography acquired by the image processor 40, the line-of-sight direction determination module 42 determines whether the line-of-sight direction S of the photographer A is on the apparatus 10 side (camera side) or not. Specifically, if the photographer A is to perform panorama photography centering on the photographer A himself/herself and the father B and the child C, for example, as illustrated in FIG. 3A, the photographer A directs the line-of-sight to the front-side display module 27 in the apparatus 10, on which the live view image is being displayed, as illustrated in FIG. 4, or to the father B and the child C.

At a time of determining whether the line-of-sight direction S of the photographer A is on the apparatus 10 side or not, the face detector 41 compares the shading pattern of the image data of omnidirectional photography acquired by the image processor 40 and the image dictionary of shading patterns which are pre-recorded in the recording module 24, determines the face part in the image data from the comparison result, and determines who is the person with this face part.

As illustrated in FIG. 5A, the line-of-sight direction determination module 42 determines whether the nostril part of the photographer A is photographed in the image data of omnidirectional photography acquired by the image processor 40.

As a result of determination, if the nostril part of the photographer A is not photographed, the line-of-sight direction determination module 42 determines that the line-of-sight direction S of the photographer A is directed to the front-side display module 27 (apparatus 10 side) of the apparatus 10.

In step S112, the line-of-sight direction determination module 42 sets the line-of-sight direction S of the photographer A, which is directed to the front-side display module 27 (apparatus 10 side) of the apparatus 10, as illustrated in FIG. 5A, to be the reference line-of-sight direction G.

The line-of-sight direction determination module 42 records the image data including the face part of the photographer A at a time if the reference line-of-sight direction G was set, for example, in the recording module 24 or the like as the initial pattern of the face part of the photographer A.

In step S113, the line-of-sight direction determination module 42 determines whether the line-of-sight direction S of the photographer A is on the left side, right side, or front side, relative to the reference line-of-sight direction G, that is, whether the determination of the bearing of the line-of-sight direction S of the photographer A has already been executed or not.

In this case, since it has not yet been determined whether the line-of-sight direction S of the photographer A is on the left side, right side, or front side, relative to the reference line-of-sight direction G, the controller 20 returns to step S102 via step S115, and determines once again in step S111 whether the line-of-sight direction S of the photographer A is on the apparatus 10 side (camera side) or not.

Since the determination that the line-of-sight direction S of the photographer A is on the apparatus 10 side has already been made, the line-of-sight direction determination module 42 determines in step S121 whether the initial pattern of the face part of the photographer A is recorded or not.

As a result of the determination, since the initial pattern of the face part of the photographer A has already been recorded in step S112, the line-of-sight direction determination module 42 compares in step S122 the initial pattern of the face part of the photographer A and the face part (hereinafter referred to as the face part of the photographer A at the present time) of the photographer A in the image data of omnidirectional photography acquired by the image processor 40 at the present time.

As a result of the comparison, the line-of-sight direction determination module 42 determines in step S123 whether the face part of the photographer A at the present time is upward, compared to the initial pattern of the face part of the photographer A, that is, whether the line-of-sight direction S of the photographer A is directed upward from the father B and the child C, as illustrated in FIG. 6B.

As a result of the determination, if the face part of the photographer A at the present time is not upward, the line-of-sight direction determination module 42 assumes in step S124 that the determination of "upward" is not made, and returns to step S102 via step S115.

If the face part of the photographer A at the present time is upward, the line-of-sight direction determination module 42 determines in step S131 whether the face part of the photographer A at the present time is rightward, compared to the initial pattern of the face part of the photographer A, that is, whether the line-of-sight direction S of the photographer A exists on the right side, as viewed from the photographer A himself/herself, as illustrated in FIG. 7C.

As a result of the determination, if the face part of the photographer A at the present time is rightward, the line-of-sight direction determination module 42 determines in step S132 that the face part of the photographer A at the present time is rightward.

On the other hand, if the face part of the photographer A at the present time is not rightward, the line-of-sight direction determination module 42 determines in step S133 whether the face part of the photographer A at the present time is leftward, compared to the initial pattern of the face part of the photographer A, that is, whether the line-of-sight direction S of the photographer A exists on the left side, as viewed from the photographer A himself/herself, as illustrated in FIG. 7B.

As a result of the determination, if the face part of the photographer A at the present time is leftward, the line-of-sight direction determination module 42 determines in step S134 that the face part of the photographer A at the present time is leftward.

If the face part of the photographer A at the present time is not leftward, since it has already been determined that the face part of the photographer A at the present time is not rightward (step S131), the line-of-sight direction determination module 42 determines in step S135 that the face part of the photographer A at the present time is frontward.

By the above process, the line-of-sight direction determination module 42 completes the determination as to whether the line-of-sight direction S of the photographer A is on the left side, right side, or front side, relative to the reference line-of-sight direction G, that is, the determination of the bearing of the line-of-sight direction S of the photographer A.

The controller 20 returns to step S102 via step S115, and determines once again in step S113 if the determination of the bearing as to whether the line-of-sight direction S of the photographer A is on the left side, right side, or front side, relative to the reference line-of-sight direction G, has been finished. As a result of the determination, since this determination has already been finished, the controller 20 goes to step S114.

In step S114, the main subject determination module 43 determines, based on the line-of-sight direction S determined by the line-of-sight direction determination module 42, a main subject in a subject to be photographed by the photographer A, for example, the father B and the child C as illustrated in FIG. 3B and FIG. 3C.

The emphasis display module 44 executes an image process for emphasis on the main subject in the image data of omnidirectional photography acquired by the image processor 40, for example, an image area corresponding to the father B and the child C as shown in FIG. 3B or FIG. 3C. The image process for emphasis executes at least one of a process of adding an index for emphasis to the main subject, such as the father B and the child C, a process of altering the position of disposition of the main subject, and a process of relatively varying the density level of the area corresponding to the main subject.

For example, the index F for emphasis is formed in an annular shape for displaying with emphasis the father B and the child C, also on a panorama image, as illustrated in FIG. 3B and FIG. 3C. The image data, to which the index F for emphasis is added, is displayed as a live view image on the front-side display module 27.

In step S115, the controller 20 determines whether or not to execute photography. Specifically, if a pressing operation of the release button of the operation determination module 22 is performed, or if a touch operation on the front-side touch panel 28 is performed, the controller 20 executes panorama photography at the time of the operation, and records the image data of the panorama acquired by the panorama photography in the recording module 24.

Specifically, if omnidirectional photography is performed as illustrated in FIG. 3A, the image processor 40 acquires image data which becomes an annular photography result corresponding to an image circle of the photographing optical system 11, as illustrated in FIG. 3B. The main subject determination module 43 determines, based on the line-of-sight direction S of the photographer A, main subject in a subject to be photographed by the photographer A on the image data, namely, in this case, the father B and the child C. The emphasis display module 44 adds an annular index F to the image data in order to display with emphasis the father B and the child C. The controller 20 develops the annular photography result corresponding to the image circle of the photographing optical system 11, thereby producing a panorama image as shown in FIG. 3C, and acquires a panorama image to which the annular index F is added in order to emphasis-display the father B.

Next, a description is given of the determination by the line-of-sight direction determination module 42 as to whether the line-of-sight direction S of the photographer A is on the apparatus 10 side or not.

The line-of-sight direction (in particular, the line-of-sight direction of the photographer A) S is, in principle, expressed by the arrow S in FIG. 5A and FIG. 5B. However, the arrow S direction cannot be detected as the exact line-of-sight direction. In the present embodiment, the arrow S direction, which is the line-of-sight direction, is determined by detecting the direction of the face part from the shading part of the nose line or eye part, and by taking into account the position of the white of the eye or the pupil.

For example, as illustrated in FIG. 7A, when the nose line is at the central part between both eye parts, and both eye parts are symmetric with respect to the nose line, it is determined that the line-of-sight direction is the arrow S direction as shown in FIG. 5A and FIG. 5B. In the determination of the line-of-sight direction S, if the pattern of the nostrils of the nose cannot be determined, it is determined that the line-of-sight direction S is downward, relative to the horizontal direction, as illustrated in FIG. 5A. If the pattern of the nostrils of the nose can be determined, it is determined that the line-of-sight direction S is the horizontal direction or is upward relative to the horizontal direction, as illustrated in FIG. 5B.

In the determination of the line-of-sight direction S, for example, the line-of-sight direction S shown in FIG. 5A and FIG. 5B may be pre-recorded as a reference line-of-sight direction, the reference line-of-sight direction and a line-of-sight direction to be determined may be compared, and the line-of-sight direction to be determined may be estimated from the comparison result.

In a case where the line-of-sight moves in a left-and-right direction, it is determined whether the line-of-sight direction is leftward or rightward, by detecting whether the position of the pupil is shifted to the left or to the right relative to the nose line.

Next, concrete determination of the line-of-sight direction S of the photographer A is described with reference to a flowchart of FIG. 13 illustrating the determination of the line-of-sight direction on the apparatus side.

In step S201, the line-of-sight direction determination module 42 determines whether a face part, for example, a face part of the photographer A, has been detected by the face detector 41 in a region on the apparatus 10 side in image data of omnidirectional photography acquired by the image processor 40. The region on the apparatus 10 side is, for example, a region where the photographer A appears in the image data when the photographer A holds the apparatus 10 so as to be able to view the image on the front-side display module 27 in an erecting state in which the photographer A directs the line-of-sight to the front-side display module 27.

As a result of the determination, if the face part of the photographer A is detected in the region on the apparatus 10 side, the line-of-sight direction determination module 42 determines in step S202, from the image data of omnidirectional photography acquired by the image processor 40, whether the nose line H of the nose part of the photographer A exists between both eye parts and the pupils are positioned at the centers of both eye parts with no displacement to the left or right, for example, as illustrated in FIG. 7A.

As a result of the determination, if the nose line H of the nose part of the photographer A exists between both eye parts and the pupils are positioned at the centers of both eye parts with no shift to the left or right, the line-of-sight direction determination module 42 determines in step S203 that the line-of-sight S of the photographer A is on the apparatus 10 side.

If the face part of the photographer A is not detected in the region on the apparatus 10 side, the line-of-sight direction determination module 42 goes from step S201 to step S204, and determines whether the face part of the photographer A is upward and the nostril part of the photographer A is photographed, as illustrated in FIG. 5B, and whether the pupil position of the photographer A is positioned downward with the line-of-sight direction S on the lower side and the line-of-sight direction S of the photographer A is directed to the front-side display module 27 of the apparatus 10.

As a result of the determination, if the face part of the photographer A is upward and the line-of-sight direction S of the photographer A is downward, the line-of-sight direction determination module 42 goes to the above-described step S202.

On the other hand, if the face part of the photographer A is upward and the line-of-sight direction S of the photographer A is not downward, the line-of-sight direction determination module 42 determines in step S205 whether the nostril part of the face part of the photographer A is hardly photographed from the image data of omnidirectional photography acquired by the image processor 40, and there is no upward/downward displacement of the pupil position of the photographer A, as illustrated in FIG. 5A.

As a result of the determination, if the nostril part of the face part of the photographer A is hardly photographed and there is no upward/downward displacement of the pupil position of the photographer A, the line-of-sight direction determination module 42 goes to the above-described step S202.

On the other hand, if the nostril part of the face part of the photographer A is photographed and there is an upward/downward displacement of the pupil position of the photographer A, the line-of-sight direction determination module 42 determines in step S206 that the line-of-sight direction S of the photographer A is on a side other than the camera side.

Next, the determination of the bearing of the line-of-sight direction S by the line-of-sight direction determination module 42 (steps S132, S134 and S135 in FIG. 12) is concretely described with reference to a flowchart of FIG. 14 illustrating the determination of the bearing of the line-of-sight direction S. Incidentally, the bearing of the line-of-sight direction S of the photographer A is any one of the left side, right side or front side, relative to the reference line-of-sight direction G, and the bearing of the line-of-sight direction S is represented by X.

In step S300, the line-of-sight direction determination module 42 determines whether the bearing of the line-of-sight direction S of the photographer A can be determined or not, for example, in accordance with the pupil positions illustrated in FIGS. 7A, 7B, 7C, 8A and 8B.

As a result of the determination, if the determination of the bearing is not possible, the line-of-sight direction determination module 42 determines in step S301 the relationship between the image of the face part of the photographer A from the image data of omnidirectional photography acquired by the image processor 40, and a voice of the photographer A and the main subject such as the father B and the child C, which is collected by the microphone 21. Specifically, in step S302, the line-of-sight direction determination module 42 determines in step S302 whether the face part of the photographer A exists in the bearing X of the line-of-sight direction S, that is, on the extension line of the line-of-sight direction S on the left side, right side or front side, relative to the reference line-of-sight direction G. In the description below, "X" means the left side, right side, or front side.

As a result of the determination, if the face part of the main subject exists on the extension line of the line-of-sight direction S on the left side, right side or front side, relative to the reference line-of-sight direction G, the line-of-sight direction determination module 42 determines in step S303 whether there is a variation in the mouth part in the face part of the main subject, for example, a movement such as the opening/closing of the mouth, which exits on the extension line of the line-of-sight direction S on the left side, right side or front side (X). The presence/absence of the movement such as the opening/closing of the mouth means the determination as to whether the photographer A has a conversation with the main subject such as the father B and the child C.

As a result of the determination, if there is a variation in the mouth part of the main subject, the line-of-sight direction determination module 42 determines in step S304 whether a voice uttered by the mouth part of the photographer A is collected or not. Since the microphone 21 collects a voice in stereo, the controller 20 can determine the direction of the collected voice from an audio signal that is output from the microphone 21. Accordingly, the line-of-sight direction determination module 42 determines whether a voice is uttered from the face part of the photographer A, by associating the direction of the collected voice and the position of the photographer A in the image data of omnidirectional photography acquired by the image processor 40.

As a result of the determination, if a voice is uttered from the face part of the photographer A, the line-of-sight direction determination module 42 determines in step S305, based on the audio signal that is output from the microphone 21, whether a voice is uttered from the face part of the photographer A, for example, on the left side, right side or front side.

As a result of the determination, if a voice is uttered from the face part of the photographer A existing on the extension line of the line-of-sight direction S at a time when the line-of-sight direction S is on the left side, right side or front side, the line-of-sight direction determination module 42 associates, in step S306, the pupil position of the eye part of the photographer A, which corresponds to the left side, right side or front side of the line-of-sight direction S obtained based on the audio signal output from the microphone 21, and the respective pupil positions shown in, for example, FIG. 7A, FIG. 7B, FIG. 7C, FIG. 8A and FIG. 8B, and records the associated data as a database in, for example, the recording module 24.

In step S310, the emphasis display module 44 executes an emphasis process on the main subject, such as the father B and the child C, which exists on the extension line of the line-of-sight direction S at a time when the line-of-sight direction S of the photographer A is on the left side, right side or front side.

As a result of the determination in step S305, if there is no voice from the main subject, such as the father B and the child C, which exists on the extension line of the line-of-sight direction S on the left side, right side or front side as viewed from the photographer A, the line-of-sight direction determination module 42 determines in step S307 whether the number of main subjects, such as persons, existing on the extension line of the line-of-sight direction S on the left side, right side or front side as viewed from the photographer A, is one or not.

As a result of the determination, if the number of main subjects, such as persons, is one, the emphasis display module 44 executes in step S310 an emphasis process on the face part of the main subject, such as a person, existing on the extension line of the line-of-sight direction S on the left side, right side or front side of the photographer A.

If the number of main subjects, such as persons, is not one, the emphasis display module 44 executes in step S312 an emphasis process on the face parts of the main subjects, such as plural persons, existing on the extension line of the line-of-sight direction S on the left side, right side or front side of the photographer A.

As a result of the determination in the above step S302, if there is no main subject such as a person existing in the bearing X of the line-of-sight direction S, that is, on the extension line of the line-of-sight direction S on the left side, right side or front side relative to the reference line-of-sight direction G, the line-of-sight direction determination module 42 emphasizes, in step S311, the main subject, such as a person, by the index F, in an angle range of, e.g. 30° with respect to the left-side, right-side or front-side line-of-sight direction S.

As a result of the determination in the above step S300, if the bearing of the line-of-sight direction S of the photographer A can be determined in accordance with the respective pupil positions shown in, for example, FIG. 7A, FIG. 7B, FIG. 7C, FIG. 8A and FIG. 8B, the line-of-sight direction determination module 42 determines in step S321 the bearing of the line-of-sight direction S of the photographer A in accordance with the respective pupil positions shown in FIG. 7A, FIG. 7B, FIG. 7C, FIG. 8A and FIG. 8B.

In this manner, according the above-described embodiment, when a subject is photographed in an omnidirectional photographing range and the photographer A is included in image data of omnidirectional photography acquired by the photographing in the omnidirectional photography, the line-of-sight direction S of the photographer A is determined. Based on the determined line-of-sight direction S, a main subject, such as the father B and the child C, in the subjects to be photographed by the photographer A, is determined, and this determined main subject is displayed with emphasis. It is thus possible to acquire such a panorama image that the main subject, such as the father B and the child C, in the subjects viewed by the photographer A can be emphasized.

The above-described embodiment is directed to the case in which image determination of, e.g. the lines of the face part or the nostrils is used for determining the line-of-sight direction S. The embodiment is not limited to this example. The line-of-sight direction may be determined, based on only images of eye parts. For example, use may be made of a method in which a reference position is preset, or a method in which a plurality of image patterns of eye parts relating to basic line-of-sight directions are pre-recorded as dictionary images, and the line-of-sight direction is determined by comparing the image data of omnidirectional photography and the dictionary images.

The apparatus 10 is not limited to the configuration including the photographing optical system 11 for acquiring a panorama image by photographing subjects in the omnidirectional photographing range. The apparatus 10 may be configured to include a photographing optical system which can simultaneously photograph the eye part of the photographer A and the view direction of the photographer A.

In the emphasis process, the index F formed in the annular shape is used. However, the index F is not limited to the annular index F, and use may be made of an index F of another shape, such as an oval shape or a rectangular shape. The emphasis process may be performed by altering, on the image data, the position of disposition of the main subject such as the father B and the child C; varying the density level of the area of the main subject such as the father B and the child C and increasing, for example, the luminance of this area; executing such an image process that a spotlight is radiated on the main subject such as the father B and the child C; lowering the contrast; or varying the exposure.

The area of emphasis, for example, the range of emphasis by the annularly formed index F, may be at an angle range of 30°, or may be set to be an emphasis range with 25° on the upper side and 10° on the lower side relative to the central part of persons D comprising a plurality of persons. The range of emphasis by the index F may be suited to the size of the main subject for emphasis including the father B and the child C.

In the case of the range of emphasis by the index F, it is clearly understood which part in a panorama image the photographer viewed. It is understood which subject was photographed as a target by the photographer. Such a panorama image can be obtained that a subject of a target to be photographed by the photographer, a subject which was viewed by the photographer, and a subject which impressed the photographer in the atmosphere at the scene of photography can be understood. Thus, when the panorama image is to be viewed later, the subject which was viewed at the time of photography can easily be understood, and this is very helpful in viewing the panorama image.

Since the line-of-sight direction S on the left side, right side or front side of the photographer A is determined, it is possible to emphasize, in the emphasis process, the main subject, such as a person, existing on the extension line of the line-of-sight direction S on the left side, right side or front side of the photographer A.

The apparatus 10 has a feature in the user interface which makes use of the image of the face part of the photographer A, and the apparatus 10 is not necessarily limited to a photographing apparatus. Needless to say, for example, the apparatus 10 is applicable to an apparatus for aiming at and operating an object such as an operating member of an apparatus for industrial use or medical use, like a remote controller of various devices, or to an operation part of a stationary device.

The apparatus 10, if applied to a camera, is applicable to such a device as to perform a wireless operation on a target image area such as an emphasis-displayed part, or to a device for observation in a concentrated manner. In a device which can photograph a subject and a photographer, the photographer holds the camera and the direction of the face part is determined to perform an operation, and thus a technique for a cooperative process becomes necessary. The apparatus 10 is applicable to any kind of devices under such conditions. The apparatus 10 is also effective for a device, such as an in-vehicle device, to which the photographer wishes to quickly tell his/her intension. Accordingly, the apparatus 10 belongs to information processing apparatuses.

Each of the processes illustrated in the flowcharts in the apparatus 10 described in the embodiment is stored as a program which can be executed by the controller 20. This program is stored in a storage medium of an external storage device, such as a memory card (e.g. ROM card, RAM card), a magnetic disk (e.g. a floppy (trademark) disk, a hard disk), an optical disk (e.g. CD-ROM, DVD), or a semiconductor memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photographing apparatus comprising:
a photographing module which simultaneously photographs a range including a main subject and at least an eye part of a photographer;
an image processor which acquires image data by executing an image process on an output signal of the photographing module;
a line-of-sight direction determination circuit which determines a line-of-sight direction of the photographer by comparing a main subject line-of-sight direction of the photographer with a reference line-of-sight direction of the photographer in the image data acquired by the image processor,
wherein the reference line-of-sight direction is a line-of-sight direction of the photographer when the photographer looks at the photographing apparatus or a display associated with the photographing apparatus, and
wherein the line-of-sight direction determination circuit sets the line-of-sight direction of the photographer as the reference line-of-sight direction when the line-of-sight direction of the photographer is in a direction of the photographing apparatus, and does not set the line-of-sight direction of the photographer as the reference line-of-sight direction when the line-of-sight direction of the photographer is not in a direction of the photographing apparatus;
a main subject determination circuit which determines the main subject to be photographed which exists on an extension line of the line-of-sight direction determined by the line-of-sight direction determination circuit and when the line-of-sight direction of the photographer is not in a direction of the photographing apparatus or a display associated with the photographing apparatus,
wherein the main subject line-of-sight direction of the photographer is a line-of-sight direction of the photographer when the photographer looks at the main subject and not at the photographing apparatus or a display associated with the photographing apparatus;
wherein the light-of-sight direction is changed from the reference line-of-sight to the main subject line-of-sight through setting a reference position based on the location of a nostril part of the photographer or a pupil position of the photographer and determining a direction of view based on a difference from the reference position;
an emphasis processor which processes the image data to display the main subject in the image data with emphasis when the main subject line-of-sight exists on the extension line of the line-of-sight of the photographer; and
a display module which displays an image corresponding to the image data and a determination result of the main subject determination circuit and with emphasis of the main subject determined by the main subject determination circuit.

2. The photographing apparatus according to claim 1, wherein the line of sight direction determination circuit determines the line-of-sight direction of the
photographer by comparing the reference line-of-sight direction and the line-of-sight direction of the photographer if the line-of-sight direction of the photographer is not on the apparatus side.

3. The photographing apparatus according to claim 2, wherein
the line-of-sight direction determination circuit determines, based on a result of comparison between the reference line-of-sight direction and the line-of-sight direction of a target, whether the line-of-sight direction of the photographer is on a left side, a right side or a front side relative to the reference line-of-sight direction.

4. The photographing apparatus according to claim 2, wherein
the line-of-sight direction determination circuit determines that the line-of-sight direction of the photographer is on the apparatus side, if a nostril part of the photographer is present, a pupil position is downward and there is no displacement with respect to a nose line of the photographer and the pupil position.

5. The photographing apparatus according to claim 2, wherein
the line-of-sight direction determination circuit determines that the line-of-sight direction of the photographer is on the apparatus side, if a nostril part of the photographer is absent, there is no upward or downward displacement of a pupil position, and there is no displacement with respect to a nose line of the photographer and the pupil position.

6. The photographing apparatus according to claim 2, wherein
the line-of-sight direction determination circuit determines that the line-of-sight direction of the photographer is on a side other than the apparatus side, if there is a displacement with respect to a nose line of the photographer and a pupil position.

7. The photographing apparatus according to claim 2, wherein
the line-of-sight direction determination circuit determines that the line-of-sight direction of the photographer is on a side other than the apparatus side, if a nostril part of the photographer is absent and there is a displacement with respect to a pupil position.

8. The photographing apparatus according to claim 3, further comprising:
a voice detector which detects a voice of a photographer and the main subject,
wherein the line-of-sight direction determination circuit determines whether there is a conversation between the photographer and the main subject, based on the main subject existing in the determined line-of-sight direction, the voice detected by the voice detector, and each of images of the photographer and the main subject, and to associate, if it is determined that there is the conversation, a pupil position of the photographer and the line-of-sight direction of any one of the left side, the right side and the front side.

9. The photographing apparatus according to claim 5, wherein
if it is determined by the line-of-sight direction determination circuit that the voice is not detected by the voice detector and the main subject is a group of persons comprising a plurality of persons, the emphasis processor processes the image data to display the group of persons in the image data with emphasis.

10. The photographing apparatus according to claim 1, wherein
the emphasis processor executes an image process for emphasis on an image area corresponding to the main subject in the image data, and
the image process for emphasis executes at least one of a process of adding an index for emphasis to the main subject, a process of altering a position of disposition of the main subject, and a process of relatively varying a density level of an area corresponding to the main subject.

11. The photographing apparatus according to claim 1, wherein the emphasis processor is such that an emphasis range for emphasis-displaying the main subject in the image data is set.

12. The photographing apparatus according to claim 1, wherein
the photographing module includes a photographing optical system for omnidirectional photography, and is configured to output image data of the omnidirectional photography.

13. A photographing method comprising:
using a photographing apparatus to simultaneously photographing a range including a main subject and at least an eye part of a photographer;
acquiring image data by executing an image process on a photography signal acquired by the photographing;
determining a line-of-sight direction of the photographer by comparing a main subject line-of-sight direction of the photographer with a reference line-of-sight direction of the photographer in the image data,
the reference line-of-sight direction is a line-of-sight direction of the photographer when the photographer looks at the photographing apparatus or a display associated with the photographing apparatus, and
wherein the the line-of-sight direction of the photographer is set as the reference line-of-sight direction when the line-of-sight direction of the photographer is in a direction of the photographing apparatus, and the line-of-sight direction of the photographer is not set as the reference line-of-sight direction when the line-of-sight direction of the photographer is not in a direction of the photographing apparatus;
determining a main subject which exists on an extension line of the line-of-sight direction,
wherein the main subject line-of-sight direction of the photographer is a line-of-sight direction of the photographer when the photographer looks at the main subject and not at the photographing apparatus or a display associated with the photographing apparatus;
wherein the light-of-sight direction is changed from the reference line-of-sight to the main subject line-of-sight through setting a reference position based on the location of a nostril part of the photographer or a pupil position of the photographer and determining a direction of view based on a difference from the reference position;
executing an emphasis process which processes the image data to display the main subject in the image data with emphasis; when the main subject line-of-sight exists on the extension line of the line-of-sight of the photographer; and
displaying an image corresponding to the image data and a result of determining the main subject which exists on the extension line of the line-of-sight direction and with emphasis of the determined main subject.

14. A non-transitory computer readable storage medium storing a photographing program of a photographing apparatus, the program comprising:
- a photographing function of causing the apparatus to simultaneously photograph a range including a main subject and at least an eye part of a photographer;
- an image process function of causing the apparatus to acquire image data by executing an image process on an output signal of the photographing function;
- a line-of-sight direction determination function of causing the apparatus to determine a line-of-sight direction of the photographer by comparing a main subject line-of-sight direction of the photographer with a reference line-of-sight direction of the photographer in the image data acquired by the image processing function,
  - the reference line-of-sight direction is a line-of-sight direction of the photographer when the photographer looks at the photographing apparatus or a display associated with the photographing apparatus, and
  - wherein when the line-of-sight direction of the photographer is in a direction of the photographing apparatus, the line-of-sight direction of the photographer is set as the reference line-of-sight direction, and when the line-of-sight direction of the photographer is not in a direction of the photographing apparatus, the line-of-sight direction of the photographer is not set as the reference line-of-sight direction,
- a main subject determination function of causing the apparatus to determine the main subject to be photographed which exists on an extension line of the line-of-sight direction determined by the line-of-sight direction determination function and when the line-of-sight direction of the photographer is not in a direction of the photographing apparatus or a display function associated with the photographing apparatus,
  - the main subject line-of-sight direction of the photographer is a line-of-sight direction of the photographer when the photographer looks at the main subject and not at the photographing apparatus or a display associated with the photographing apparatus;
- wherein the light-of-sight direction is changed from the reference line-of-sight to the main subject line-of-sight through setting a reference position based on the location of a nostril part of the photographer or a pupil position of the photographer and determining a direction of view based on a difference from the reference position; and
- an emphasis process function of causing the apparatus to process the image data to display the main subject in the image data with emphasis when the main subject line-of-sight exists on the extension line of the line-of-sight of the photographer; and
- a display function of causing the apparatus to display an image corresponding to the image data and a determination result of the main subject determination function and with emphasis of the main subject determined by the main subject determination function.

15. The photographing apparatus according to claim 1, wherein
the photographing module acquires a panoramic image.

* * * * *